(12) United States Patent
Wang et al.

(10) Patent No.: US 8,968,928 B2
(45) Date of Patent: *Mar. 3, 2015

(54) PRIMER FOR BATTERY ELECTRODE

(71) Applicant: Sion Power Corporation, Tucson, AZ (US)

(72) Inventors: Yongzhong Wang, Tucson, AZ (US); Zhesheng Xu, Tucson, AZ (US); John D. Affinito, Tucson, AZ (US); Charles D. Skaggs, Tucson, AZ (US)

(73) Assignee: Sion Power Corporation, Tucson, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/078,127

(22) Filed: Nov. 12, 2013

(65) Prior Publication Data
US 2014/0072873 A1 Mar. 13, 2014

Related U.S. Application Data

(63) Continuation of application No. 12/682,011, filed as application No. PCT/US2008/012042 on Oct. 23, 2008, now Pat. No. 8,871,387.

(60) Provisional application No. 61/035,845, filed on Mar. 12, 2008, provisional application No. 61/000,582, filed on Oct. 26, 2007.

(51) Int. Cl.
H01M 4/13 (2010.01)
H01M 4/62 (2006.01)
(Continued)

(52) U.S. Cl.
CPC ............ *H01M 4/622* (2013.01); *H01M 4/0404* (2013.01); *H01M 4/139* (2013.01);
(Continued)

(58) Field of Classification Search
USPC .............. 429/215, 209, 218.1, 217, 212, 213
See application file for complete search history.

(56) References Cited

U.S. PATENT DOCUMENTS 3,877,983 A 4/1975 Hovsepian
4,605,602 A 8/1986 Feigenbaum et al.
(Continued)

FOREIGN PATENT DOCUMENTS

JP 07-201363 A2 8/1995
JP 11-505660 A 5/1999
(Continued)

OTHER PUBLICATIONS

International Search Report and Written Opinion for PCT/US2008/012042 mailed Dec. 31, 2008.
(Continued)

*Primary Examiner* — Patrick Ryan
*Assistant Examiner* — Julian Anthony
(74) *Attorney, Agent, or Firm* — Wolf, Greenfield & Sacks, P.C.

(57) ABSTRACT

Primer arrangements that facilitate electrical conduction and adhesive connection between an electroactive material and a current collector are presented. In some embodiments, primer arrangements described herein include first and second primer layers. The first primer layer may be designed to provide good adhesion to a conductive support. In one particular embodiment, the first primer layer comprises a substantially uncrosslinked polymer having hydroxyl functional groups, e.g., polyvinyl alcohol. The materials used to form the second primer layer may be chosen such that the second primer layer adheres well to both the first primer layer and an electroactive layer. In certain embodiments including combinations of first and second primer layers, one or both of the first and second primer layers comprises less than 30% by weight of a crosslinked polymeric material. A primer including only a single layer of polymeric material is also provided.

24 Claims, 10 Drawing Sheets

(51) Int. Cl.
*H01M 4/60* (2006.01)
*H01M 4/58* (2010.01)
*H01M 4/04* (2006.01)
*H01M 4/139* (2010.01)
*H01M 4/66* (2006.01)
*H01M 10/052* (2010.01)

(52) U.S. Cl.
CPC ............ *H01M 4/621* (2013.01); *H01M 4/623* (2013.01); *H01M 4/667* (2013.01); *H01M 10/052* (2013.01); *Y02E 60/122* (2013.01)
USPC .......... 429/217; 429/212; 429/213; 429/215; 429/218.1

(56) References Cited

U.S. PATENT DOCUMENTS

| | | | |
|---|---|---|---|
| 4,621,035 A | 11/1986 | Bruder | |
| 4,664,991 A | 5/1987 | Perichaud et al. | |
| 4,739,018 A | 4/1988 | Armand et al. | |
| 4,833,048 A | 5/1989 | De Jonghe et al. | |
| 4,917,974 A | 4/1990 | De Jonghe et al. | |
| 5,108,855 A | 4/1992 | Daifuku et al. | |
| 5,162,175 A | 11/1992 | Visco et al. | |
| 5,194,341 A | 3/1993 | Bagley et al. | |
| 5,324,599 A | 6/1994 | Oyama et al. | |
| 5,441,830 A | 8/1995 | Moulton et al. | |
| 5,441,831 A | 8/1995 | Okamoto et al. | |
| 5,478,676 A | 12/1995 | Turi et al. | |
| 5,514,492 A | 5/1996 | Marincic et al. | |
| 5,516,598 A | 5/1996 | Visco et al. | |
| 5,529,860 A | 6/1996 | Skotheim et al. | |
| 5,538,812 A | 7/1996 | Lee et al. | |
| 5,554,460 A | 9/1996 | Wu et al. | |
| 5,589,297 A | 12/1996 | Koga et al. | |
| 5,601,947 A | 2/1997 | Skotheim et al. | |
| 5,690,702 A | 11/1997 | Skotheim et al. | |
| 5,707,759 A | 1/1998 | Simon et al. | |
| 5,723,230 A | 3/1998 | Naoi et al. | |
| 5,783,330 A | 7/1998 | Naoi et al. | |
| 5,792,575 A | 8/1998 | Naoi et al. | |
| 5,824,120 A | 10/1998 | Mitchell et al. | |
| 5,827,615 A | 10/1998 | Touhsaent et al. | |
| 5,882,819 A | 3/1999 | Naoi et al. | |
| 6,117,590 A | 9/2000 | Skotheim et al. | |
| 6,153,337 A | 11/2000 | Carlson et al. | |
| 6,183,901 B1 | 2/2001 | Ying et al. | |
| 6,201,100 B1 | 3/2001 | Gorkovenko et al. | |
| 6,280,879 B1 | 8/2001 | Andersen et al. | |
| 6,306,545 B1 | 10/2001 | Carlson et al. | |
| 6,403,263 B1 * | 6/2002 | Roach ........................... | 429/233 |
| 6,544,688 B1 | 4/2003 | Cheng | |
| 6,573,004 B1 | 6/2003 | Igarashi et al. | |
| 6,613,475 B2 | 9/2003 | Fauteux et al. | |
| 6,673,273 B2 | 1/2004 | Ba Le et al. | |
| 7,261,979 B2 | 8/2007 | Gozdz et al. | |
| 7,351,498 B2 * | 4/2008 | Watarai et al. ................. | 429/217 |
| 7,771,870 B2 | 8/2010 | Affinito et al. | |
| 7,846,583 B2 | 12/2010 | Oh et al. | |
| 2002/0001721 A1 | 1/2002 | Barriere et al. | |
| 2003/0003352 A1 | 1/2003 | Kweon et al. | |
| 2003/0040578 A1 | 2/2003 | Sugo et al. | |
| 2003/0062259 A1 | 4/2003 | Mushiake et al. | |
| 2004/0142101 A1 | 7/2004 | Eshraghi et al. | |
| 2005/0069778 A1 | 3/2005 | Bonnet et al. | |
| 2005/0164090 A1 | 7/2005 | Kim et al. | |
| 2005/0186473 A1 | 8/2005 | Mitchell et al. | |
| 2005/0238934 A1 | 10/2005 | Takahashi | |
| 2006/0024579 A1 | 2/2006 | Kolosnitsyn et al. | |
| 2006/0032045 A1 | 2/2006 | Naarmann et al. | |
| 2006/0127773 A1 | 6/2006 | Kawakami et al. | |
| 2007/0221265 A1 | 9/2007 | Affinito | |
| 2010/0291442 A1 | 11/2010 | Wang et al. | |

FOREIGN PATENT DOCUMENTS

| | | |
|---|---|---|
| JP | 11-339771 A2 | 12/1999 |
| JP | 2000-123823 A | 4/2000 |
| JP | 2001-085065 A | 3/2001 |
| JP | 2002-075378 A1 | 3/2002 |
| JP | 2002-304997 A2 | 10/2002 |
| JP | 2003-007354 A2 | 1/2003 |
| JP | 2004-31127 A | 1/2004 |
| KR | 10-2002-011564 A | 2/2002 |
| WO | WO 96/04689 A1 | 2/1996 |
| WO | WO 99/33125 A1 | 7/1999 |
| WO | WO 99/33130 A1 | 7/1999 |
| WO | WO 2003/018687 A2 | 3/2003 |
| WO | WO 2005/076936 A2 | 8/2005 |
| WO | WO 2008/070059 | 6/2008 |

OTHER PUBLICATIONS

International Preliminary Report on Patentability for PCT/US2008/012042 mailed May 6, 2010.

Extended European Search Report for EP 08842763.8 mailed Sep. 30, 2013 for European Application No. 08842663.8.

Alamgir et al., Room temperature polymer electrolytes. Lithium Batteries, New Materials, Developments and Perspectives, Chapter 3, pp. 93-136, Elsevier, Amsterdam (1994).

Dominey, Current state of the art on lithium battery electrolytes. Lithium Batteries, New Materials, Developments and Perspectives, Chapter 4, pp. 137-165, Elsevier, Amsterdam (1994).

* cited by examiner

PRIMER FOR BATTERY ELECTRODE

RELATED APPLICATIONS

This application is continuation of U.S. application Ser. No. 12/682,011, filed Jul. 30, 2010, which is a U.S. National Stage patent application based on International Application No. PCT/US2008/12042, filed Oct. 23, 2008, which claims priority to U.S. Provisional Application No. 61/000,582, filed Oct. 26, 2007 and U.S. Provisional Application No. 61/035,845, filed Mar. 12, 2008, each of which are incorporated herein by reference in their entirety.

FIELD OF INVENTION

The present invention relates generally to electrochemical cells, and more specifically, to primers for electrodes of electrochemical cells.

BACKGROUND

A typical electrochemical cell has a cathode and an anode which participate in an electrochemical reaction. To fabricate an electrode, electroactive materials can be deposited onto a conductive support, which can act as a current collector for the electrode. Maintaining electrical contact between the electroactive material and the conductive support is vital to efficient functioning of the electrochemical cell.

It is known that adhesion layers, also known as "primers" or "primer layers", deposited between the electroactive material and the conductive support can adhere to and provide electrical communication between the electroactive material and conductive support. Although existing primers are available, many do not provide good adhesion to both the electroactive material and conductive support simultaneously, while also providing good electrical contact between the layers. As a result, some electrochemical cells including such primers have low discharge capacities. Accordingly, there is a need for primers that 1) provide good adhesion and electrical contact between the electroactive material and conductive support to promote high discharge capacities in an electrochemical cell, 2) are compatible with the electrolyte, and 3) are able to protect the current collector from possible corrosive effects of electroactive species in the electrochemical cell during charge and/or discharge.

SUMMARY OF THE INVENTION

Electrochemical cells, and more specifically, primers for electrodes of electrochemical cells are provided.

In one embodiment, an electrode is provided. The electrode comprises a conductive support, a first primer layer positioned adjacent the conductive support and comprising a first polymeric material, wherein the first primer layer comprises less than 30% by weight of a crosslinked polymeric material. The electrode also includes a second primer layer positioned adjacent the first primer layer and comprising a second polymeric material, wherein the second primer layer comprises less than 30% by weight of a crosslinked polymeric material. The electrode also includes an electroactive layer in electrical communication with the second primer layer.

In another embodiment, a current collector is provided. The current collector comprises a conductive support, a first primer layer positioned adjacent the conductive support and comprising a first polymeric material, and a second primer layer positioned adjacent the first primer layer and comprising a second polymeric material, wherein the first and/or second polymeric materials comprises hydroxyl functional groups.

In another embodiment, an electrode comprises a conductive support and a first primer layer positioned adjacent the conductive support and comprising a first polymeric material, wherein the first primer layer comprises greater than 30% by weight of a crosslinked polymeric material. The electrode also includes a second primer layer positioned adjacent the first primer layer and comprising a second polymeric material, wherein the second primer layer comprises greater than 30% by weight of a crosslinked polymeric material. The electrode also includes an electroactive layer in electrical communication with the second primer layer.

In another embodiment, a method of forming a cathode is provided. The method comprises positioning at least one primer layer adjacent a conductive support, the primer layer comprising a polymeric material that includes hydroxyl functional groups. Optionally, at least a portion of the polymeric material may be crosslinked. The method also includes positioning a cathode slurry adjacent the primer layer, the cathode slurry comprising a cathode active material, a conductive filler, and a solvent, wherein the cathode slurry comprises greater than 30% by weight of water. At least a portion of the solvent can be removed from the cathode slurry.

In another embodiment, a cathode is provided. The cathode comprises a conductive support, and a primer layer positioned adjacent the conductive support and comprising a polymeric material that includes hydroxyl functional groups. Optionally, at least a portion of the polymeric material may be crosslinked. The cathode also includes a cathode active layer in electrical communication with the primer layer, wherein the cathode active layer is made by a process in which it comprises greater than 30% by weight of water prior to being dried.

In another embodiment, a method of forming a cathode is provided. The method comprises mixing a polymeric material comprising hydroxyl functional groups in a solvent at a temperature of greater than 80° C., adding a conductive filler to the polymeric material and solvent to form a primer slurry, and positioning the primer slurry on a conductive support to form a primer layer. The method also includes positioning a cathode slurry adjacent the primer layer, the cathode slurry comprising a cathode active material, a conductive filler, and a solvent. At least a portion of the solvent may be removed from the cathode slurry.

In another embodiment, a lithium battery is provided. The lithium battery comprises an anode comprising lithium metal as the active anode species and a cathode comprising sulfur as the active cathode species supported by a cathode current collector. The area specific resistance of the lithium battery is less than 50 ohm·$cm^2$. In certain embodiments, the area specific resistance is less than 40, 30, 20, or 10 ohm·$cm^2$. The lithium battery may further include a primer layer positioned between the active cathode species and the cathode current collector. In one embodiment, the primer layer comprises a polymeric material comprising hydroxyl groups. For instance, the primer layer may comprise or be formed of polyvinyl alcohol, which may be at least partially crosslinked or substantially uncrosslinked.

Other advantages and novel features of the present invention will become apparent from the following detailed description of various non-limiting embodiments of the invention when considered in conjunction with the accompanying figures. In cases where the present specification and a document incorporated by reference include conflicting and/or inconsistent disclosure, the present specification shall control. If two or more documents incorporated by reference include conflicting and/or inconsistent disclosure with respect to each other, then the document having the later effective date shall control.

BRIEF DESCRIPTION OF THE DRAWINGS

Non-limiting embodiments of the present invention will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention. In the figures.

DETAILED DESCRIPTION

Figure 1:
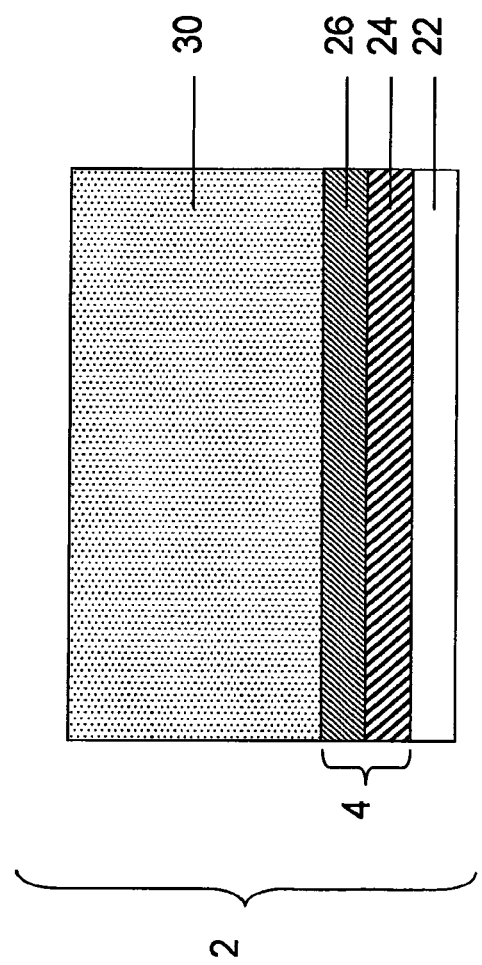
FIG. 1 shows an electrode including first and second primer layers, an electroactive layer, and a conductive support according to one embodiment of the invention.

The present invention relates generally to electrochemical cells, and more specifically, to primers for electrodes of electrochemical cells. In particular, primer arrangements and compositions that facilitate electrical conduction and adhesive connection between an electroactive layer and a current collector are presented. In some embodiments, primer arrangements described herein include first and second primer layers, which can be of the same or different material. The first primer layer may be designed to provide good adhesion to a conductive support and may comprise, for example, a crosslinked or substantially uncrosslinked polymer (e.g., a binder) having hydroxyl functional groups, e.g., polyvinyl alcohol. The materials used to form the second primer layer may be chosen such that the second primer layer adheres well to both the first primer layer and an electroactive layer. In certain embodiments including combinations of first and second primer layers, one or both of the first and second primer layers comprises less than 30% by weight of a crosslinked polymeric material. In other embodiments, one or both of the first and second primer layers comprises between 30-60% by weight of a crosslinked polymeric material. A primer including only a single layer of polymeric material is also provided.

One aspect of the invention is the discovery that low degrees of crosslinking, or essentially no crosslinking, in one or more primer layers for devices as described herein function well. Those of ordinary skill in the art would have expected that as crosslinking of a primer layer is reduced or eliminated, cohesion of that primer layer under relatively rigorous conditions to which the device is subjected in practice might be compromised to the extent that the device would fail prematurely; crosslinking would be expected to improve cohesion of a primer layer to increase robustness. It would have been unexpected that improved adhesion properties between primer layers (and/or between a primer layer and a conductive support or an electroactive material), facilitated by little or no crosslinking within the primer layers, would be possible while still maintaining intra primer layer cohesion necessary for sufficient robustness. Certain aspects of the present invention therefore are surprising in the combination of reduced or essentially eliminated crosslinking of one or more primer layers with both sufficient adhesion and internal cohesion within and between primer layers for a robust device. The working examples and appended figures demonstrate this robustness.

Accordingly, in certain embodiments, the primer layers described herein are constructed and arranged to have one or more of the following features: good adhesion and electrical conduction between the current collector and the primer layer (e.g., a first primer layer), good adhesion and electrical conduction between the first primer layer and a second primer layer in a multi-layer primer, good adhesion and electrical conduction between the primer layer (e.g., a second primer layer) and an electroactive layer (which may comprise electroactive materials and other optional additives such as electronically conductive materials), and prevention of possible corrosive effects of the electroactive material on the current collector, e.g., during charge and/or discharge. Additionally, batteries described herein comprising primers of the invention may have lower area specific resistance than batteries including certain commercial primers.

Primer layer(s) described herein are preferably thin (e.g., less than about 10 microns) to reduce overall battery weight. Furthermore, primer layer(s) should be stable in the electrolyte and should not interfere with the structural integrity of the electrodes in order for the electrochemical cell to have a high electrochemical "capacity" or energy storage capability (i.e., reduced capacity fade).

Many embodiments described herein involve lithium-sulfur rechargeable batteries (i.e., batteries including a sulfur-containing cathode and a lithium anode). However, wherever lithium-sulfur batteries are described, it is to be understood that any analogous alkali metal battery (alkali metal anode) can be used, and wherever cathodes including sulfur as an active cathode species are described herein, it is to be understood that any suitable cathode active species can be used. Additionally, although rechargeable batteries are intended to benefit from the invention, non-rechargeable (i.e., primary) batteries are intended to benefit from the invention as well.

Furthermore, although embodiments of the invention are particularly useful for adhering an electrochemically active layer to an electrically conductive material with different structural and surface properties, the present invention may be applicable to other applications in which adhesion and/or electrical connection is desired.

As described above, one aspect of the invention involves a multi-layer primer that achieves good adhesion to both a conductive support and an electroactive material. As shown in the illustrative embodiment of FIG. 1, electrode 2 includes conductive support 22 and primer 4. Primer 4 includes a first primer layer 24 adjacent the conductive support, as well as second primer layer 26 adjacent the first primer layer. As shown, second primer layer 26 is in electrical communication with electroactive layer 30 (e.g., a cathode active layer comprising sulfur or an anode active layer comprising lithium metal). Optionally, additional layers (not shown), such as a multi-layer structure that protects the electroactive material from the electrolyte, may be present on top of electroactive material 30, as described in more detail in U.S. patent application Ser. No. 11/400,781, filed Apr. 6, 2006, entitled, "Rechargeable Lithium/Water, Lithium/Air Batteries" to Affinito et al., which is incorporated herein by reference in its entirety.

In some embodiments, one or both of first primer layer 24 and second primer layer 26 are formed of a polymeric material. The polymeric materials used to form the two layers may be the same or different. In some cases, at least a portion of the polymeric material of the first and/or second primer layers is/are crosslinked; in other cases, the polymeric material(s) is/are substantially uncrosslinked.

At least a portion of a polymer is crosslinked when there are crosslinking bonds connecting two or more individual polymer chains to one another at at least one position not at a terminal end of one of the polymer chains. For instance, in cases in which a primer layer comprises a certain percentage by weight of a crosslinked polymeric material, that percentage by weight of the individual polymer chains within that layer may be linked at at least one intermediate (e.g., non-terminal) position along the polymer chain with another polymer chain within that layer. In some embodiments, crosslinking bonds are covalent bonds. In other embodiments, crosslinking bonds are ionic bonds. Together, crosslinked polymer chains create interconnected, three-dimensional polymer networks. Crosslinking bonds attaching independent polymer chains to one another may be generated by methods such as UV radiation, gamma-radiation, crosslinking agents, thermal stimulation, photochemical stimulation, electron beams, self-crosslinking, free radicals, and other methods known to one of ordinary skill in the art.

In some cases, the first and/or second primer layer comprises less than 30% by weight of a crosslinked polymeric material (e.g., as determined after the primer layer has been dried). That is, less than 30% by weight of the individual polymer chains which form the polymeric material of a particular layer may be crosslinked at at least one intermediate (e.g., non-terminal) position along the chain with another individual polymer chain within that layer. One or both of the first and second primer layers may comprise less than 25% by weight, less than 20% by weight, less than 15% by weight, less than 10% by weight, less than 5% by weight, or less than 2% by weight, or 0% of a crosslinked polymeric material. In certain embodiments, the first and/or second primer layer comprises less than 30% by weight of a covalently crosslinked polymeric material. For example, one or both of the first and second primer layers may comprise less than 25% by weight, less than 20% by weight, less than 15% by weight, less than 10% by weight, less than 5% by weight, or less than 2% by weight, or 0% of a covalently crosslinked polymeric material. In one particular embodiment, one or both of the first and second primer layers is essentially free of covalently crosslinked material.

It should be understood that while a primer layer may include, for example, less than 30% by weight of a crosslinked polymeric material, the total amount of polymeric material (e.g., combined crosslinked and non-crosslinked polymeric material) in the primer layer may vary, e.g., from 20-90% by weight of the primer layer, as described in more detail below.

In one particular embodiment, first primer layer 24 comprises less than 30% by weight of a crosslinked polymeric material (e.g., polyvinyl alcohol) and second primer layer 26 also includes less than 30% by weight of a crosslinked polymeric material (e.g., polyacrylate, polyvinyl pyrrolidone vinyl acetate copolymer, and polyvinyl butyral). In other embodiments, a one of the first and second primer layers comprises less than 30% by weight of a crosslinked polymeric material, and the other of the first and second primer layers comprises greater than 30% by weight of a crosslinked polymeric material. In yet other embodiments, both of the first and second primer layers may include greater than 30% by weight of a crosslinked polymeric material.

Sometimes, an electrode includes first and second primer layers that are formed of the same material, but the first and second primer layers have different degrees of crosslinking. For instance, the first primer layer may comprise substantially uncrosslinked polyvinyl alcohol, and the second primer layer may comprise crosslinked polyvinyl alcohol. Other arrangements are also possible.

In some embodiments, the one or more primer layers of a primer comprise a substantially uncrosslinked polymeric material. As used herein, the term "substantially uncrosslinked" means that during normal processing of the polymeric material to form a primer layer and to fabricate an electrochemical cell associated therewith, methods commonly known for inducing crosslinking in the polymeric material, such as exposure to ultraviolet (UV) radiation and addition of crosslinking agents, are not used. A substantially uncrosslinked material may be essentially free of crosslinked material to the extent that it has no greater degree of crosslinking than is inherent to the polymeric material. In some embodiments, a substantially uncrosslinked material is essentially free of crosslinked material to the extent that it has no greater degree of crosslinking than is inherent to the polymeric material after normal processing of the polymeric material to form the primer layer and to fabricate an electrochemical cell associated therewith. Typically, a substantially uncrosslinked material has less than 10% by weight, less than 7% by weight, less than 5% by weight, less than 2% by weight, or less than 1% by weight of crosslinked polymeric material in its composition. In certain embodiments, a substantially uncrosslinked material has less than 10% by weight, less than 7% by weight, less than 5% by weight, less than 2% by weight, or less than 1% by weight of covalently crosslinked polymeric material in its composition.

In one embodiment, first primer layer 24 of FIG. 1 comprises less than 30% by weight of a crosslinked polymeric material (e.g., less than 20%, less than 15%, or less than 10% of a crosslinked polymeric material) and second primer layer 26 is substantially crosslinked to varying degrees. The first primer layer may be substantially uncrosslinked or crosslinked, for example, to less than 30% by weight, to allow it to have adequate adhesion to the second primer layer. The second primer layer may comprise, for example, greater than 10% by weight, greater than 20% by weight, greater than 30% by weight, greater than 40% by weight, greater than 50% by weight, greater than 60% by weight, greater than 70% by weight, greater than 80% by weight, or greater than 90% by weight of a crosslinked polymeric material. One or more of the methods described above that induce crosslinking such as exposure of the material to UV radiation or to a crosslinking agent may be used. Crosslinking of the second primer layer may, in some cases, promote better adhesion of the second primer layer with one or both of the electroactive layer and first primer layer. As described in more detail below, the formation of an electrode including a crosslinked second primer layer may optionally involve the addition of a component (e.g., a solvent) in the electroactive layer that preferentially interacts with a component in the second primer layer. The second primer layer may be crosslinked to the electroactive layer and/or first primer layer, or substantially uncrosslinked to the electroactive layer and/or first primer layer.

In another embodiment, at least a portion of a polymeric material of the first primer layer is crosslinked and the polymeric material of the second primer layer is optionally crosslinked or substantially uncrosslinked. The first primer layer (and, optionally, the second primer layer) may comprise, for example, greater than 10% by weight, greater than 20% by weight, greater than 30% by weight, greater than 40% by weight, greater than 50% by weight, greater than 60% by weight, greater than 70% by weight, greater than 80% by weight, or greater than 90% by weight of a crosslinked polymeric material. Other arrangements of crosslinked or substantially uncrosslinked first and second primer layers are also possible.

Polymeric material may be crosslinked to varying degrees depending on the number of chains involved in at least one crosslinking bond. The percent by weight of crosslinked polymer out of a total mass of polymeric material may be determined by identifying the mass of polymers engaged in crosslinking bonds relative to the whole mass under consideration. Such a determination may be achieved by one of ordinary skill in the art by a variety of scientific methods including, for example, FTIR and differential scanning calorimetry (DCS).

Figure 2:
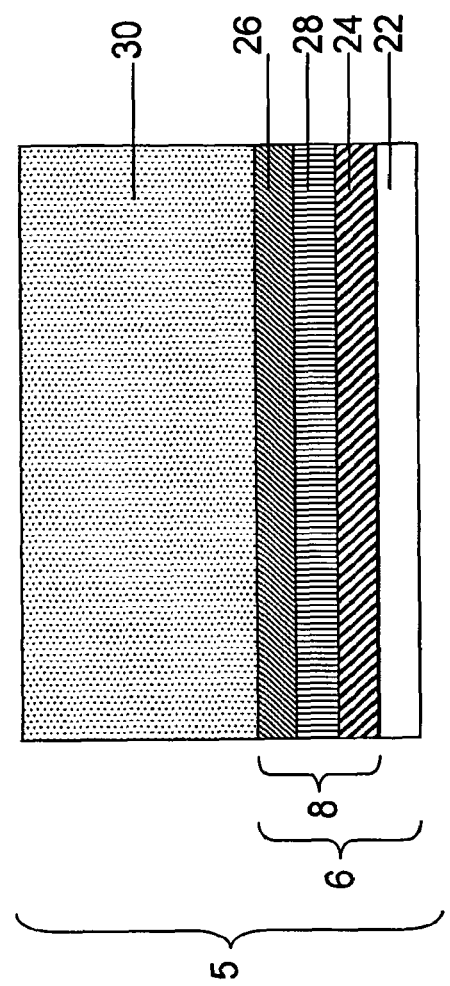
FIG. 2 shows a primer including first and second primer layers and an intermediate layer attached to a conductive support according to another embodiment of the invention.

Another multi-layer primer arrangement is illustrated in FIG. 2. As shown in the illustrative embodiment of FIG. 2, electrode 5 comprises current collector 6 including primer 8. Primer 8 comprises first primer layer 24 separated from second primer layer 26 by intermediate layer 28. Electroactive material 30 is in electrical communication with the second primer layer. In some embodiments, intermediate layer 28 is a third primer layer. Accordingly, in some embodiments of the invention, primers including more than two primer layers may be used as appropriate. In other embodiments, intermediate layer 28 is a conductive support material, a metal layer, a plasma treated layer, an ionic layer, or the like. The composition and thickness of layer 28 may be chosen, for example, based on its electrical conductivity, adhesiveness, and/or other mechanical or physical properties. In other embodiments, intermediate layer 28 is positioned between the electroactive material 30 and second primer layer 26, and/or between first primer layer 24 and conductive support 22. In some cases, an electrode of the invention includes two or more intermediate layers positioned between various layers of the electrode.

As illustrated in FIG. 2, first primer layer 24 is adjacent second primer layer 26 via a third, intermediate layer 28. In other embodiments, e.g., as shown in FIG. 1, first primer layer 24 is immediately adjacent second primer layer 26.

Another aspect of the invention is the unexpected discovery that a single-layer primer positioned between a conductive support and an electroactive material layer can provide good adhesion and electrical communication between such layers. Typically in some batteries of this type, a single-layer primer can provide good adhesion and electrical communication to one, but not both, of the conductive support and electroactive material. For instance, a single-layer primer formed of a substantially non-crosslinked material may, in some cases, have good adhesion to the electroactive material, but poor adhesion to the conductive support. On the other hand, certain single-layer primers formed of a crosslinked polymeric material may have good adhesion to the conductive support, but poor adhesion to the electroactive material. The inventors have discovered, however, that by processing the single-layer primer and electroactive material layer in a particular manner that promotes physical and/or chemical interaction between the appropriate layers, good adhesion of the single-layer primer to both the conductive support and electroactive material can be achieved.

Figure 3:
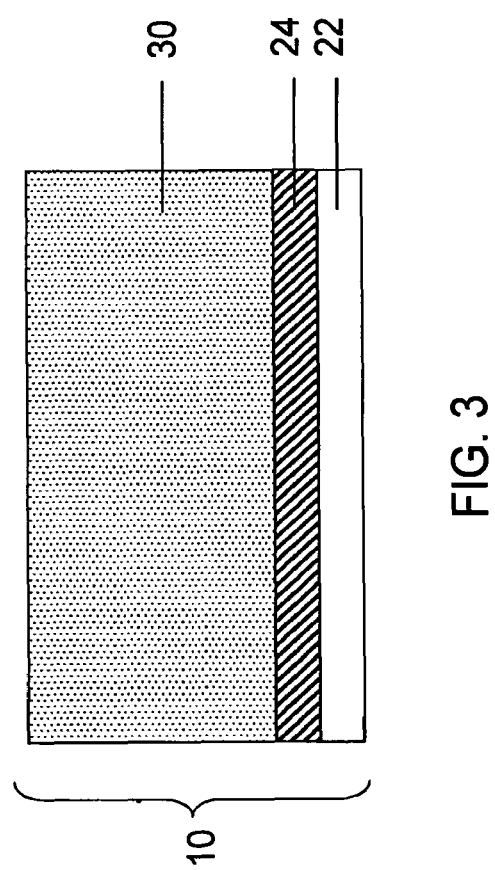
FIG. 3 shows a single-layer primer attached to a conductive support according to another embodiment of the invention.

An example of an electrode including a single-layer primer positioned between a current collector and an electroactive material is shown in FIG. 3. As shown in the embodiment illustrated in FIG. 3, electrode 10 includes conductive support 22 in electrical communication with electroactive material 30 via primer layer 24. The single-layer primer may be crosslinked in some embodiments, but uncrosslinked in others. Advantageously, a single-layer primer that can provide good electrical connection as well as good adhesion to both the conductive support and the electroactive material can reduce the overall battery weight, as well as the number of fabrication steps required to assemble the battery. It should be understood that in some embodiments, electrode 10 can include other components such as an intermediate layer (e.g., a plasma treated layer) between layers 22 and 24 and/or between layers 24 and 30; such an intermediate layer may improve adhesion between the adjacent layers.

The inventors have unexpectedly discovered that certain primer layer(s) can provide good adhesion between the conductive support, the electroactive material, and/or a second primer layer, e.g., by modifying the composition of one or more of the layers during processing. In one embodiment, this is achieved by including components in both the primer layer and electroactive material layer that interact favorably with each other to promote adhesion. For example, in one embodiment, the primer layer includes hydroxyl functional groups and the electroactive material is formed as a slurry (i.e., a mixture of at least two components) including a relatively high amount of water (e.g., 20-80 wt % water). Additionally or alternatively, in certain embodiments a relatively high amount of water may be present in a slurry of the primer composition. Without wishing to be bound by theory, the inventors hypothesize that the water in the slurry can solubilize at least portions of a polymer within the slurry. For instance, the water may solubilize all or portions of the polymeric material (e.g., polyvinyl alcohol) used to form the primer layer (or electroactive layer). The solubilized polymer can then participate in hydrogen bonding with hydroxyl surface groups that may be present at a surface in contact with the polymer, which can cause good adhesion between the polymer and the surface. For example, if the electroactive layer includes a material that can hydrogen bond with the hydroxyl groups of the primer layer, better adhesion may be achieved. In another example, a surface in contact with the primer layer may be an aluminum current collector that includes a surface layer of aluminum oxide; a portion of the surface layer may also include hydroxyl groups. These hydroxyl surface groups can participate in hydrogen bonding with the hydroxyl groups of the solvated polymer of the primer layer. In addition, in some embodiments, the solubilized polymer of a first primer layer may physically interact with a polymeric material (e.g., of a second primer layer or an electroactive material layer) in contact with the first primer layer such that the molecules (e.g., polymer chains) of each layer are entangled with one another at the interface. This entanglement can lead to adhesion of the two layers even after drying of the layers (when water and/or other solvents may be removed).

Additionally or alternatively, the electroactive material layer may include certain chemical compositions that interact favorably with the primer layer and which remain in the electroactive material layer even after drying. For example, the electroactive material layer may include a polymeric material (e.g., a binder) or other material containing certain functional groups (e.g., hydroxyl or ether groups) that can interact with those of the primer layer. In one particular embodiment, both the electroactive material layer and the primer layer include one or more polymers that can crosslink with each other. The primer layer may be prepared such that it has a relatively high amount (e.g., an excess) of crosslinking agent. Upon positioning of the slurry containing the electroactive material adjacent the primer layer, crosslinking agent at the interface of the two layers can cause crosslinking between a polymer in the electroactive material layer and a polymer in the primer layer.

According to one embodiment of the invention, a method of forming an electrode (e.g., a cathode) includes positioning a primer layer comprising a polymeric material including hydroxyl functional groups, at least a portion of the polymeric material being crosslinked, adjacent a conductive support. An electrode slurry can be positioned adjacent the primer layer, the electrode slurry comprising greater than 10 wt %, greater than 20 wt %, greater than 30 wt %, or greater than 40 wt % of a solvent (e.g., water) that can interact with a component in the primer layer (e.g., a hydroxyl-containing polymer such as polyvinyl alcohol). In some instances, the electrode slurry includes between 30-60 wt % of such a solvent (e.g., water). The electrode may then be partially or completely dried to remove at least a portion of the solvent. This process can result in good adhesion between the layers.

In other embodiments, the electrode slurry can include other solvents in addition to, or in place of, water (e.g., other solvents that can form a hydrogen bond), which can result in favorable interactions with components of the primer layer. In these and other embodiments, the primer layer may also be processed in a manner that allows it to interact favorably with components of the electroactive material layer. For example, to promote dissolution and/or dispersion of the polymeric material of the primer layer, the polymeric material may be mixed in an appropriate solvent at a temperature of greater than 60° C., greater than 70° C., greater than 80° C., or greater than 90° C. prior to positioning the primer layer.

It should be understood that the compositions and methods described above may be used to achieve good adhesion for single-layer primers, multi-layer primers, and other applications in which good adhesion and/or electrical connection is desired.

As described above, in some embodiments, a primer layer described herein (e.g., the first and/or second polymeric materials of the first and/or second primer layers, respectively, of FIGS. 1-2 and/or the primer layer of FIG. 3) comprises hydroxyl functional groups. Hydroxyl groups may provide good adhesion to a conductive support such as an aluminum foil and/or an aluminized polyethylene terephthalate (PET) film. Non-limiting examples of hydroxyl-containing polymers include polyvinyl alcohol, polyvinyl butyral, polyvinyl formal, vinyl acetate-vinyl alcohol copolymers, ethylene-vinyl alcohol copolymers, and vinyl alcohol-methyl methacrylate copolymers. The hydroxyl-containing polymer may have varying levels of hydrolysis (thereby including varying amounts of hydroxyl groups). For instance, a vinyl-based polymer may be greater than 50% hydrolyzed, greater than 60% hydrolyzed, greater than 70% hydrolyzed, greater than 80% hydrolyzed, greater than 90% hydrolyzed, greater than 95% hydrolyzed, or greater than 99% hydrolyzed. A greater degree of hydrolysis may allow better adhesion of the hydroxyl-containing material to a conductive support and, in some cases, may cause the polymer to be less soluble in the electrolyte. In other embodiments, a polymer having hydroxyl groups may be less than 50% hydrolyzed, less than 40% hydrolyzed, less than 30% hydrolyzed, less than 20% hydrolyzed, or less than 10% hydrolyzed with hydroxyl functional groups. In one particular embodiment, a first primer layer comprises hydroxyl groups and a second primer layer has a different material composition than that of the first primer layer.

In some embodiments, a primer layer described herein comprises polyvinyl alcohol. The polyvinyl alcohol in a primer layer may be crosslinked in some instances, and substantially uncrosslinked in other instances. In one particular embodiment, a primer layer immediately adjacent a conductive support (e.g., a first primer layer) comprises polyvinyl alcohol. In another embodiment, the primer layer consists essentially of polyvinyl alcohol. The polyvinyl alcohol in such embodiments may be substantially uncrosslinked, or in other cases, less than 30% of the material used to form the first primer layer is crosslinked. For instance, a primer layer immediately adjacent a conductive support and including polyvinyl alcohol may comprise less than 30% by weight, less than 20% by weight, less than 15% by weight, less than 10% by weight, less than 5% by weight, or less than 2% by weight, of crosslinked polyvinyl alcohol. Such a primer layer may optionally be adjacent a second primer layer, which may have a different material composition than that of the first primer layer. In some instances, the second primer layer is crosslinked. The second primer layer may comprise any suitable material that can adhere well to the first primer layer and the electroactive material. Examples of such materials include, but are not limited to, polyvinyl butyral, polyacrylate, polyvinyl pyrrolidone, and polyvinyl acetate, as well as copolymers thereof. Other suitable polymers are described in more detail below. In one particular embodiment, the material used to form the second primer layer is crosslinked so as to provide good adhesion between the first primer layer and a sulfur-containing cathodes.

In certain embodiments, two primer layers of a primer comprise polymers having hydroxyl functional groups. The percentage of hydroxyl functional groups in the polymers of the first and second primer layers may differ. For example, in one embodiment, the first primer layer comprises at least at least 20% more, at least 40% more, at least 60% more, at least 80% more, at least 100% more, at least 150% more, or at least 200% more hydroxyl groups than the second primer layer. One particular example is a first primer layer comprising polyvinyl alcohol and a second primer layer comprising polyvinyl butyral (e.g., where polyvinyl alcohol has been reacted to varying degrees with butanal and/or other compounds).

A crosslinking agent is a molecule with a reactive portion(s) designed to interact with functional groups on the polymer chains in a manner that will form a crosslinking bond between one or more polymer chains. Examples of crosslinking agents that can crosslink polymeric materials used for primer layers described herein include, but are not limited to: polyamide-epichlorohydrin (polycup 172); aldehydes (e.g., formaldehyde and urea-formaldehyde); dialdehydes (e.g., glyoxal, glutaraldehyde, and hydroxyadipaldehyde); acrylates (e.g., ethylene glycol diacrylate, di(ethylene glycol) diacrylate, tetra(ethylene glycol) diacrylate, methacrylates, ethylene glycol dimethacrylate, di(ethylene glycol) dimethacrylate, tri(ethylene glycol) dimethacrylate); amides (e.g., N,N'-methylenebisacrylamide, N,N'-(1,2-dihydroxyethylene)bisacrylamide, N-(1-hydroxy-2,2-dimethoxyethyl) acrylamide); silanes (e.g., methyltrimethoxysilane, methyltriethoxysilane, tetramethoxysilane (TMOS), tetraethoxysilane (TEOS), tetrapropoxysilane, methyltris(methylethyldetoxime)silane, methyltris(acetoxime)silane, methyltris(methylisobutylketoxime)silane, dimethyldi(methylethyldetoxime)silane, trimethyl(methylethylketoxime)silane, vinyltris(methylethylketoxime)silane, methylvinyldi(mtheylethylketoxime)silane, methylvinyldi(cyclohexaneoneoxxime)silane, vinyltris(mtehylisobutylketoxime)silane, methyltriacetoxysilane, tetraacetoxysilane, and phenyltris(methylethylketoxime)silane); divinylbenzene; melamine; zirconium ammonium carbonate; dicyclohexylcarbodiimide/dimethylaminopyridine (DCC/DMAP); 2-chloropyridinium ion; 1-hydroxycyclohexylphenyl ketone; acetophenon dimethylketal; benzoylmethyl ether; aryl trifluorovinyl ethers; benzocyclobutenes; phenolic resins (e.g., condensates of phenol with formaldehyde and lower alcohols, such as methanol, ethanol, butanol, and isobutanol), epoxides; melamine resins (e.g., condensates of melamine with formaldehyde and lower alcohols, such as methanol, ethanol, butanol, and isobutanol); polyisocyanates; dialdehydes; and other crosslinking agents known to those of ordinary skill in the art.

In embodiments including a crosslinked polymeric material and a crosslinking agent, the weight ratio of the polymeric material to the crosslinking agent may vary over a wide range for reasons including the functional-group content of the polymer, its molecular weight, the reactivity and functionality of the crosslinking agent, the desired rate of crosslinking, the degree of stiffness/hardness desired in the polymeric material, and the temperature at which the crosslinking reaction may occur. Non-limiting examples of ranges of weight ratios between the polymeric material and the crosslinking agent include from 100:1 to 50:1, from 20:1 to 1:1, from 10:1 to 2:1, and from 8:1 to 4:1.

As mentioned above, a primer layer may include any suitable amount of polymeric material to achieve the desired properties. For example, the total amount of polymeric material (e.g., combined crosslinked and non-crosslinked polymeric material) in a primer layer may be in the range of, for example, 20-90% by weight of the primer layer (e.g., as determined after drying the primer layer). In some instances, a primer layer includes a total amount of a polymeric material in the range of, for example, 20-40%, 30-60%, 40-80%, or 60-80% by weight of the primer layer. The remaining material used to form the primer layer may include a conductive filler, a crosslinking agent, and/or other materials as described herein.

Certain types of polymers are known to form crosslinking bonds under appropriate conditions. Non-limiting examples of crosslinkable polymers include: polyvinyl alcohol, polyvinylbutryl, polyvinylpyridyl, polyvinyl pyrrolidone, polyvinyl acetate, acrylonitrile butadiene styrene (ABS), ethylene-propylene rubbers (EPDM), EPR, chlorinated polyethylene (CPE), ethelynebisacrylamide (EBA), acrylates (e.g., alkyl acrylates, glycol acrylates, polyglycol acrylates, ethylene ethyl acrylate (EEA)), hydrogenated nitrile butadiene rubber (HNBR), natural rubber, nitrile butadiene rubber (NBR), certain fluoropolymers, silicone rubber, polyisoprene, ethylene vinyl acetate (EVA), chlorosulfonyl rubber, flourinated poly (arylene ether) (FPAE), polyether ketones, polysulfones, polyether imides, diepoxides, diisocyanates, diisothiocyanates, formaldehyde resins, amino resins, plyurethanes, unsaturated polyethers, polyglycol vinyl ethers, polyglycol divinyl ethers, copolymers thereof, and those described in U.S. Pat. No. 6,183,901 to Ying et al. of the common assignee for protective coating layers for separator layers. Those of ordinary skill in the art can choose appropriate polymers that can be crosslinked, as well as suitable methods of crosslinking, based upon general knowledge of the art in combination with the description herein.

Other classes polymers that may be suitable for use in a primer layer (either crosslinked or non-crosslinked) include, but are not limited to, polyamines (e.g., poly(ethylene imine) and polypropylene imine (PPI)); polyamides (e.g., polyamide (Nylon), poly(ε-caprolactam) (Nylon 6), poly(hexamethylene adipamide) (Nylon 66)), polyimides (e.g., polyimide, polynitrile, and poly(pyromellitimide-1,4-diphenyl ether) (Kapton)); vinyl polymers (e.g., polyacrylamide, poly(2-vinyl pyridine), poly(N-vinylpyrrolidone), poly(methylcyanoacrylate), poly(ethylcyanoacrylate), poly(butylcyanoacrylate), poly(isobutylcyanoacrylate), poly(vinyl acetate), poly (vinyl alcohol), poly(vinyl chloride), poly(vinyl fluoride), polyvinylidene fluorides ($PVF_2$ or PVDF), poly (2-vinyl pyridine), polychlorotrifluoro ethylene, poly(isohexylcynaoacrylate), polyisobutylene, poly(methyl styrene), poly(methylmethacrylate) (PMMA), polyethylacrylate, polyethylmethacrylate, UV curable acrylates or methacrylates); polyacetals; polyolefins (e.g., poly(butene-1), poly(n-pentene-2), polypropylene, polytetrafluoroethylene (Teflon)); polyesters (e.g., polycarbonate, polybutylene terephthalate, polyhydroxybutyrate); polyethers (poly(ethylene oxide) (PEO), poly(propylene oxide) (PPO), poly(tetramethylene oxide) (PTMO), heat curable divinyl ethers); polyaramides (e.g., poly(imino-1,3-phenylene iminoisophthaloyl) and poly(imino-1,4-phenylene iminoterephthaloyl)); polyheteroaromatic compounds (e.g., polybenzimidazole (PBI), polybenzobisoxazole (PBO) and polybenzobisthiazole (PBT)); polyheterocyclic compounds (e.g., polypyrrole); polyurethanes; phenolic polymers (e.g., phenol-formaldehyde); polyalkynes (e.g., polyacetylene); polydienes (e.g., 1,2-polybutadiene, cis or trans-1,4-polybutadiene, ethylene-propylene-diene (EPDM) rubbers); polysiloxanes (e.g., poly (dimethylsiloxane) (PDMS), poly(diethylsiloxane) (PDES), polydiphenylsiloxane (PDPS), and polymethylphenylsiloxane (PMPS)); and inorganic polymers (e.g., polyphosphazene, polyphosphonate, polysilanes, polysilazanes). The mechanical and physical properties (e.g., conductivity, resistivity) of these polymers are known. Accordingly, those of ordinary skill in the art can choose suitable polymers for use in lithium batteries, e.g., based on their mechanical and/or electronic properties, adhesiveness to conductive supports and/or electroactive materials, solubility in a particular electrolyte, etc., by, for example, tailoring the amounts of components of polymer blends, adjusting the degree of crosslinking (if any), etc. Simple screening tests such as those described herein can be used to select polymers that have the physical/mechanical properties.

The above examples of crosslinkable polymers may be crosslinked, or substantially uncrosslinked, in primer layers of the invention. In addition, other types of polymers may be used as first and/or second primer layers of the invention. The above examples of polymers may also be used in electroactive material layers described herein.

Determining suitable compositions, configurations (e.g., crosslinked or substantially uncrosslinked) and dimensions of primers can be carried out by those of ordinary skill in the art, without undue experimentation. As described above in connection with a multi-layer primer, a first primer layer may be chosen based on, for example, its electrically conductive properties, its inertness in the electrolyte, and its ability to adhere to the current collector and, optionally, to a second primer layer. A suitable second primer layer may provide good adhesion between the electroactive material (and/or other additives, e.g., an electronically conductive material, of an electroactive layer) and the first primer layer, while having good electrical conductivity and inertness in the electrolyte. The particular materials used to form the first and/or second primer layers may depend on, for example, the material compositions of the conductive support, electroactive material, and electrolyte, as well as the method used to deposit the layers. The dimensions of the primer layers may be chosen such that the electrochemical cell has a low overall weight, while providing suitable adhesion to their respective adjacent layers.

One simple screening test for choosing appropriate materials for a primer layer may include forming the primer layer and immersing the layer in an electrolyte and observing whether inhibitory or other destructive behavior (e.g., delamination) occurs compared to that in a control system. The same can be done with other layers (e.g., one or more of the conductive support, electroactive material, and/or other primer layer) attached to the primer layer. Another simple screening test may include forming an electrode including the one or more primer layers and immersing the electrode in the electrolyte of the battery in the presence of the other battery components, discharging/charging the battery, and observing whether specific discharge capacity is higher or lower compared to a control system. A high discharge capacity may indicate good adhesion and/or electrical conduction between the respective components of the battery, and a low discharge capacity may indicate delamination, poor electrical conductivity in a layer, and/or poor electrical communication between layers of the electrode. To test whether a primer layer adheres adequately, a wipe test may be performed. The wipe test may include, for example, applying a solvent (e.g., isopropyl alcohol) to the primer layer and determining whether the primer layer can be wiped away with the solvent. Adhesion can also be tested by bending the layers to determine whether delamination occurs between the layers. Another simple screening test may include measuring the adhesiveness or force required to remove a primer layer from a unit area of a surface (e.g., a peel test), which can be measured in $N/m^2$, using a tensile testing apparatus or another suitable apparatus. Such experiments can optionally be performed in the presence of a solvent (e.g., an electrolyte) or other components (e.g., fillers) to determine the influence of the solvent and/or components on adhesion. Another possible screening is a scotch tape test where a strip of tape is applied on the primer layer and removed. If primer stays on the conductive layer, adhesion is good. If the primer layer comes off with the strip of tape, adhesion is poor. Other simple tests are known and can be conducted by those of ordinary skill in the art.

The thickness of a primer layer (e.g., first and/or second primer layers) may vary over a range from about 0.1 microns to about 10 microns. For instance, the thickness of the primer layer may be between 0.1-1 microns thick, between 1-5 microns thick, or between 5-10 microns thick. The thickness of a polymer layer may be no greater than, e.g., 10 microns thick, no greater than 7 microns thick, no greater than 5 microns thick, no greater than 3 microns thick, no greater than 2.5 microns thick, no greater than 1 micron thick, no greater than 0.5 microns thick, no greater than 0.3 microns thick, or no greater than 0.1 microns thick. In some embodiments including a multi-layer primer, a first primer layer has the same thickness as a second primer layer. In other embodiments, the first primer layer may have a different thickness than the second primer layer.

In some cases, conductive fillers may be added to the material used to form a primer layer. Conductive fillers can increase the electrically conductive properties of the polymeric material of the primer layer and may include, for example, conductive carbons such as carbon black (e.g., Vulcan XC72R carbon black, Printex Xe-2, or Akzo Nobel Ketjen EC-600 JD), graphite fibers, graphite fibrils, graphite powder (e.g., Fluka #50870), activated carbon fibers, carbon fabrics, non-activated carbon nanofibers. Other non-limiting examples of conductive fillers include metal coated glass particles, metal particles, metal fibers, nanoparticles, nanotubes, nanowires, metal flakes, metal powders, metal fibers, metal mesh. The amount of conductive filler in a primer layer, if present, may be present in the range of, for example, 10-90% or 20-80% by weight of the primer layer (e.g., as measured after an appropriate amount of solvent has been removed from the primer layer and/or after the layer has been appropriately cured). For instance, the first and/or second primer layer may comprise a conductive filler in the range of 20-40% by weight, 20-60% by weight, 40-80% by weight, 60-80% by weight of the primer layer. In some embodiments, a conductive filler may include a conductive polymer. Examples of suitable electroactive conductive polymers include, but are not limited to, electroactive and electronically conductive polymers selected from the group consisting of polypyrroles, polyanilines, polyphenylenes, polythiophenes, and polyacetylenes. Preferred conductive polymers for certain embodiments are polypyrroles, polyanilines, and polyacetylenes. Other conductive materials known to those of ordinary skill in the art can also be used as conductive fillers.

Mixing of the various components can be accomplished using any of a variety of methods known in the art so long as the desired dissolution or dispersion of the components is obtained. Suitable methods of mixing include, but are not limited to, mechanical agitation, grinding, ultrasonication, ball milling, sand milling, and impingement milling.

Mixing of the various components can occur at various temperatures. For instance, the various components may be mixed at greater than or equal to 25° C., greater than or equal to 50° C., greater than or equal to 75° C., or greater than or equal to 90° C. for a suitable amount of time to obtain a desired dissolution or dispersion of components. For example, in some instances, a polymer used for a primer layer (e.g., polyvinyl alcohol) is mixed at a temperature of greater than or equal to 25° C., greater than or equal to 50° C., greater than or equal to 75° C., or greater than or equal to 90° C. Mixing at such temperatures may be performed until the polymer is dissolved and/or dispersed as desired. This solution/dispersion can then be mixed with other components of the primer (e.g., a conductive filler, solvent, crosslinker, etc.), e.g., at a suitable temperature, to form a primer slurry.

The conductive support typically includes a conductive substance with good adhesion and electrically conductive connection to the first primer layer. The conductive support can function as a current collector useful in efficiently collecting the electrical current generated throughout the electrode and in providing an efficient surface for attachment of the electrical contacts leading to the external circuit. A wide range of conductive supports are known in the art. Suitable conductive supports include, but are not limited to, those including metal foils (e.g., aluminum foil), polymer films, metallized polymer films (e.g., aluminized plastic films, such as aluminized polyester film), electrically conductive polymer films, polymer films having an electrically conductive coating, electrically conductive polymer films having an electrically conductive metal coating, and polymer films having conductive particles dispersed therein. In some embodiments of the invention, the conductive support may comprise a conductive metal such as aluminum, copper, and nickel. Other conductive supports may include, for example, expanded metals, metal mesh, metal grids, expanded metal grids, metal wool, woven carbon fabric, woven carbon mesh, non-woven carbon mesh, and carbon felt.

Primer layers and electro active layers (e.g., cathode active layers) described herein may be deposited by any of a variety of methods generally known in the art, and then dried using techniques known in the art. Suitable hand coating techniques include, but are not limited to, the use of a coating rod or gap coating bar. Suitable machine coating methods include, but are not limited to, the use of roller coating, gravure coating, slot extrusion coating, curtain coating, and bead coating. Polymer layers can also be spin-coated onto a surface. Web coating can also be employed. If removal of some or all of the solvent/liquid from a mixture is desired, this can be accomplished by any of a variety of methods known in the art. Examples of suitable methods for the removal of solvents from the mixture include, but are not limited to, hot air convection, heat, infrared radiation, flowing gases, vacuum, reduced pressure, extraction, and by simply air drying.

Drying and/or crosslinking may be performed at a range of temperatures. Suitable temperatures include those above which the liquid medium becomes volatile, typically above the boiling point, and also those at which the crosslinking reaction between appropriate groups and the crosslinking agent occurs at an acceptable rate. Suitable temperatures are also below those at which the conductive support, for example, a metallized plastic film, may be deformed or damaged. In some embodiments, the drying and/or crosslinking step is performed at a temperature of from about 60-170° C.

In some embodiments, primer layers described herein can adhere to a positive or electroactive material, i.e., materials that form a cathode. Suitable electroactive materials for use as cathode active materials in the cathode of the electrochemical cells of the invention include, but are not limited to, electroactive transition metal chalcogenides, electroactive conductive polymers, electroactive sulfur-containing materials, and combinations thereof. As used herein, the term "chalcogenides" pertains to compounds that contain one or more of the elements of oxygen, sulfur, and selenium. Examples of suitable transition metal chalcogenides include, but are not limited to, the electroactive oxides, sulfides, and selenides of transition metals selected from the group consisting of Mn, V, Cr, Ti, Fe, Co, Ni, Cu, Y, Zr, Nb, Mo, Ru, Rh, Pd, Ag, Hf, Ta, W, Re, Os, and Ir. In one embodiment, the transition metal chalcogenide is selected from the group consisting of the electroactive oxides of nickel, manganese, cobalt, and vanadium, and the electroactive sulfides of iron. In one embodiment, a cathode includes one or more of the following materials: manganese dioxide, carbon, iodine, silver chromate, silver oxide and vanadium pentoxide, copper oxide, copper oxyphosphate, lead sulfide, copper sulfide, iron sulfide, lead bismuthate, bismuth trioxide, cobalt dioxide, copper chloride, manganese dioxide, and carbon. In another embodiment, the cathode active layer comprises an electroactive conductive polymer. Examples of suitable electroactive conductive polymers include, but are not limited to, electroactive and electronically conductive polymers selected from the group consisting of polypyrroles, polyanilines, polyphenylenes, polythiophenes, and polyacetylenes. Preferred conductive polymers include polypyrroles, polyanilines, and polyacetylenes.

In some embodiments, electroactive materials for use as cathode active materials in electrochemical cells described herein include electroactive sulfur-containing materials. "Electroactive sulfur-containing materials," as used herein, relates to cathode active materials which comprise the element sulfur in any form, wherein the electrochemical activity involves the oxidation or reduction of sulfur atoms or moieties. The nature of the electroactive sulfur-containing materials useful in the practice of this invention may vary widely, as known in the art. For example, in one embodiment, the electroactive sulfur-containing material comprises elemental sulfur. In another embodiment, the electroactive sulfur-containing material comprises a mixture of elemental sulfur and a sulfur-containing polymer. Thus, suitable electroactive sulfur-containing materials may include, but are not limited to, elemental sulfur and organic materials comprising sulfur atoms and carbon atoms, which may or may not be polymeric. Suitable organic materials include those further comprising heteroatoms, conductive polymer segments, composites, and conductive polymers.

Examples of sulfur-containing polymers include those described in: U.S. Pat. Nos. 5,601,947 and 5,690,702 to Skotheim et al.; U.S. Pat. Nos. 5,529,860 and 6,117,590 to Skotheim et al.; U.S. Pat. No. 6,201,100 issued Mar. 13, 2001, to Gorkovenko et al. of the common assignee, and PCT Publication No. WO 99/33130. Other suitable electroactive sulfur-containing materials comprising polysulfide linkages are described in U.S. Pat. No. 5,441,831 to Skotheim et al.; U.S. Pat. No. 4,664,991 to Perichaud et al., and in U.S. Pat. Nos. 5,723,230, 5,783,330, 5,792,575 and 5,882,819 to Naoi et al. Still further examples of electroactive sulfur-containing materials include those comprising disulfide groups as described, for example in, U.S. Pat. No. 4,739,018 to Armand et al.; U.S. Pat. Nos. 4,833,048 and 4,917,974, both to De Jonghe et al.; U.S. Pat. Nos. 5,162,175 and 5,516,598, both to Visco et al.; and U.S. Pat. No. 5,324,599 to Oyama et al.

In one embodiment, an electroactive sulfur-containing material of a cathode active layer comprises greater than 50% by weight of sulfur. In another embodiment, the electroactive sulfur-containing material comprises greater than 75% by weight of sulfur. In yet another embodiment, the electroactive sulfur-containing material comprises greater than 90% by weight of sulfur.

The cathode active layers of the present invention may comprise from about 20 to 100% by weight of electroactive cathode materials (e.g., as measured after an appropriate amount of solvent has been removed from the cathode active layer and/or after the layer has been appropriately cured). In one embodiment, the amount of electroactive sulfur-containing material in the cathode active layer is in the range of 5-30% by weight of the cathode active layer. In another embodiment, the amount of electroactive sulfur-containing material in the cathode active layer is in the range of 20% to 90% by weight of the cathode active layer.

Non-limiting examples of suitable liquid media (e.g., solvents) for the preparation of cathodes (as well as primer layers of electrodes described herein) include aqueous liquids, non-aqueous liquids, and mixtures thereof. In some embodiments, liquids such as, for example, water, methanol, ethanol, isopropanol, propanol, butanol, tetrahydrofuran, dimethoxyethane, acetone, toluene, xylene, acetonitrile, cyclohexane, and mixtures thereof can be used. Of course, other suitable solvents can also be used as needed.

Positive electrode layers may be prepared by methods known in the art. For example, one suitable method comprises the steps of: (a) dispersing or suspending in a liquid medium the electroactive sulfur-containing material, as described herein; (b) optionally adding to the mixture of step (a) a conductive filler and/or binder; (c) mixing the composition resulting from step (b) to disperse the electroactive sulfur-containing material; (d) casting the composition resulting from step (c) onto a suitable substrate; and (e) removing some or all of the liquid from the composition resulting from step (d) to provide the cathode active layer.

Suitable negative electrode materials for anode active layers described herein include, but are not limited to, lithium metal such as lithium foil and lithium deposited onto a conductive substrate, and lithium alloys (e.g., lithium-aluminum alloys and lithium-tin alloys). While these are preferred negative electrode materials, the current collectors may also be used with other cell chemistries.

Methods for depositing a negative electrode material (e.g., an alkali metal anode such as lithium) onto a substrate may include methods such as thermal evaporation, sputtering, jet vapor deposition, and laser ablation. Alternatively, where the anode comprises a lithium foil, or a lithium foil and a substrate, these can be laminated together by a lamination process as known in the art to form an anode.

Positive and/or negative electrodes may optionally include one or more layers that interact favorably with a suitable electrolyte, such as those described in International Patent Application No. PCT/US2007/024805, filed Dec. 4, 2007 and entitled "Separation of Electrolytes", by Mikhaylik et al., which is incorporated herein by reference in its entirety.

The electrolytes used in electrochemical or battery cells can function as a medium for the storage and transport of ions, and in the special case of solid electrolytes and gel electrolytes, these materials may additionally function as a separator between the anode and the cathode. Any liquid, solid, or gel material capable of storing and transporting ions may be used, so long as the material is electrochemically and chemically unreactive with respect to the anode and the cathode, and the material facilitates the transport of ions (e.g., lithium ions) between the anode and the cathode. The electrolyte may be electronically non-conductive to prevent short circuiting between the anode and the cathode.

The electrolyte can comprise one or more ionic electrolyte salts to provide ionic conductivity and one or more liquid electrolyte solvents, gel polymer materials, or polymer materials. Suitable non-aqueous electrolytes may include organic electrolytes comprising one or more materials selected from the group consisting of liquid electrolytes, gel polymer electrolytes, and solid polymer electrolytes. Examples of non-aqueous electrolytes for lithium batteries are described by Dorniney in Lithium Batteries, New Materials, Developments and Perspectives, Chapter 4, pp. 137-165, Elsevier, Amsterdam (1994). Examples of gel polymer electrolytes and solid polymer electrolytes are described by Alamgir et al. in Lithium Batteries, New Materials, Developments and Perspectives, Chapter 3, pp. 93-136, Elsevier, Amsterdam (1994). Heterogeneous electrolyte compositions that can be used in batteries described herein are described in an U.S. Provisional application filed Dec. 4, 2006 and entitled "Separation of Electrolytes", by Mikhaylik et al.

Examples of useful non-aqueous liquid electrolyte solvents include, but are not limited to, non-aqueous organic solvents, such as, for example, N-methyl acetamide, acetonitrile, acetals, ketals, esters, carbonates, sulfones, sulfites, sulfolanes, aliphatic ethers, cyclic ethers, glymes, polyethers, phosphate esters, siloxanes, dioxolanes, N-alkylpyrrolidones, substituted forms of the foregoing, and blends thereof. Fluorinated derivatives of the foregoing are also useful as liquid electrolyte solvents.

In some cases, aqueous solvents can be used as electrolytes for lithium cells. Aqueous solvents can include water, which can contain other components such as ionic salts. As noted above, in some embodiments, the electrolyte can include species such as lithium hydroxide, or other species rendering the electrolyte basic, so as to reduce the concentration of hydrogen ions in the electrolyte.

Liquid electrolyte solvents can also be useful as plasticizers for gel polymer electrolytes, i.e., electrolytes comprising one or more polymers forming a semi-solid network. Examples of useful gel polymer electrolytes include, but are not limited to, those comprising one or more polymers selected from the group consisting of polyethylene oxides, polypropylene oxides, polyacrylonitriles, polysiloxanes, polyimides, polyphosphazenes, polyethers, sulfonated polyimides, perfluorinated membranes (NAFION resins), polydivinyl polyethylene glycols, polyethylene glycol diacrylates, polyethylene glycol dimethacrylates, derivatives of the foregoing, copolymers of the foregoing, crosslinked and network structures of the foregoing, and blends of the foregoing, and optionally, one or more plasticizers. In some embodiments, a gel polymer electrolyte comprises between 10-20%, 20-40%, between 60-70%, between 70-80%, between 80-90%, or between 90-95% of a heterogeneous electrolyte by volume.

In some embodiments, one or more solid polymers can be used to form an electrolyte. Examples of useful solid polymer electrolytes include, but are not limited to, those comprising one or more polymers selected from the group consisting of polyethers, polyethylene oxides, polypropylene oxides, polyimides, polyphosphazenes, polyacrylonitriles, polysiloxanes, derivatives of the foregoing, copolymers of the foregoing, crosslinked and network structures of the foregoing, and blends of the foregoing.

In addition to electrolyte solvents, gelling agents, and polymers as known in the art for forming electrolytes, the electrolyte may further comprise one or more ionic electrolyte salts, also as known in the art, to increase the ionic conductivity.

Examples of ionic electrolyte salts for use in the electrolytes of the present invention include, but are not limited to, LiSCN, LiBr, LiI, LiClO$_4$, LiAsF$_6$, LiSO$_3$CF$_3$, LiSO$_3$CH$_3$, LiBF$_4$, LiB(Ph)$_4$, LiPF$_6$, LiC(SO$_2$CF$_3$)$_3$, and LiN(SO$_2$CF$_3$)$_2$. Other electrolyte salts that may be useful include lithium polysulfides (Li$_2$S$_x$), and lithium salts of organic ionic polysulfides (LiS$_x$R)$_n$, where x is an integer from 1 to 20, n is an integer from 1 to 3, and R is an organic group, and those disclosed in U.S. Pat. No. 5,538,812 to Lee et al.

In some embodiments, electrochemical cells may further comprise a separator interposed between the cathode and anode. The separator may be a solid non-conductive or insulative material which separates or insulates the anode and the cathode from each other preventing short circuiting, and which permits the transport of ions between the anode and the cathode.

The pores of the separator may be partially or substantially filled with electrolyte. Separators may be supplied as porous free standing films which are interleaved with the anodes and the cathodes during the fabrication of cells. Alternatively, the porous separator layer may be applied directly to the surface of one of the electrodes, for example, as described in PCT Publication No. WO 99/33125 to Carlson et al. and in U.S. Pat. No. 5,194,341 to Bagley et al.

A variety of separator materials are known in the art. Examples of suitable solid porous separator materials include, but are not limited to, polyolefins, such as, for example, polyethylenes and polypropylenes, glass fiber filter papers, and ceramic materials. Further examples of separators and separator materials suitable for use in this invention are those comprising a microporous xerogel layer, for example, a microporous pseudo-boehmite layer, which may be provided either as a free standing film or by a direct coating application on one of the electrodes, as described in U.S. Pat. Nos. 6,153,337 and 6,306,545 by Carlson et al. of the common assignee. Solid electrolytes and gel electrolytes may also function as a separator in addition to their electrolyte function.

The inventors have also discovered that lithium batteries having certain performance characteristics can be achieved. For instance, in one embodiment, a lithium battery including an anode comprising lithium metal as the active anode species and a cathode comprising sulfur as the active cathode species has an area specific resistance of less than 50 ohm·cm$^2$. That is, the area specific resistance of the entire battery assembly including any electrolyte, separator, or other component(s) of the battery is less than 50 ohm·cm$^2$. In certain embodiments, the area specific resistance of a lithium battery is less than 40, 30, 20, 10, or 5 ohm·cm$^2$. Such area specific resistances can be achieved, in some cases, by using components that reduce the internal resistance or polarization of the battery, and/or by promoting electronic conduction between components (e.g., between an electrode and a current collector). For example, in one embodiment, a lithium battery includes one or more primer layers positioned between the active cathode species and the cathode current collector, at least one of the primer layers including a polymeric material comprising hydroxyl groups. The primer layer(s) may comprise or be essentially formed of polyvinyl alcohol, which may be at least partially crosslinked or substantially uncrosslinked. The primer layer(s) may have other characteristics (e.g., a certain weight percent crosslinking) as described herein. The hydroxyl groups of the primer layer may increase adhesion between the current collector and the electroactive material and/or promote electrical conduction between the electrode and the electroactive material, resulting in a lower area specific resistance of the battery. In addition, the inclusion of such a primer layer in a battery may increase the discharge capacity and specific energy density of the battery. For example, a battery including a primer described herein may achieve an area specific resistance of less than 50 ohm·cm$^2$ and an energy density of at least 150, 250, 350, or 500 Wh/kg.

Those of ordinary skill in the art can determine area specific resistance by methods known in the art. For example, the area specific resistance of a particular battery can be determined as follows. The battery can be discharged and charged for a certain number of times. At the next cycle, fully-charged batteries can be discharged at different currents (I), within a certain range. The cell voltage, V(I), can be measured at the middle of discharge at the different currents. Cell polarization, P, can then be calculated as a difference between the cell open circuit voltage (OCV) at the middle of discharge and the voltage at a certain current V(I) according to equation 1:

$$P = OCV - V(I) \quad (1)$$

The cell polarization vs. discharge current can be plotted; the slope of the line represents cell direct current resistance (DCR), as shown in equation 2.

$$DCR = dP/dI \quad (2)$$

To determine cathode-separator-anode stack area specific resistance (ASR), the cell DCR can first be corrected for tab resistance $R_{tab}$ (e.g., resistance of any tab used in the electrode assembly) and then converted into ASR by taking into account the active electrode area A, according to equation 3:

$$ASR = (DCR - R_{tab}) * A \quad (3)$$

Example 10 describes the fabrication of a lithium battery including a primer layer comprising polyvinyl alcohol and the measurement of area specific resistance of the battery according to one embodiment of the invention.

The figures that accompany this disclosure are schematic only, and illustrate a substantially flat battery arrangement. It is to be understood that any electrochemical cell arrangement can be constructed, employing the principles of the present invention, in any configuration. For example, with reference to FIG. 1, electrode 2 may be covered on the side opposite the side at which components 24, 26, and 30 are illustrated with a similar or identical set of components 24, 26, and 30. In this arrangement, a substantially minor-image structure is created with a minor plane passing through electrode 2. This would be the case, for example, in a "rolled" battery configuration in which a layer of electrode 2 is surrounded on each side by structures 24, 26, and 30 (or, in alternative arrangements layered structures illustrated in other figures herein). On the outside of each protective structure of the anode an electrolyte is provided and, opposite the electrolyte, an opposite electrode (e.g., an anode in the case of electrode 2 being a cathode). In a rolled arrangement, or other arrangement including multiple layers of alternating anode and cathode functionality, the structure involves anode, electrolyte, cathode, electrolyte, anode, etc., where each anode can include anode stabilization structures as described in any part of this disclosure, or in more detail in U.S. patent application Ser. No. 11/400,025, filed Apr. 6, 2006, entitled, "Electrode Protection in both Aqueous and Non-Aqueous Electrochemical Cells, including Rechargeable Lithium Batteries," to Affinito et al., which is incorporated herein by reference in its entirety. Of course, at the outer boundaries of such an assembly, a "terminal" anode or cathode will be present. Circuitry to interconnect such a layered or rolled structure is well-known in the art.

The following examples are intended to illustrate certain embodiments of the present invention, but are not to be construed as limiting and do not exemplify the full scope of the invention. The following materials were used as received in the Examples below: Celvol 425 (polyvinyl alcohol) from Celanese Corporation; Celvol 165 (polyvinyl alcohol, 99.4% hydrolyzed) and Celvol 425 (polyvinyl alcohol, 96.0% hydrolyzed) from Celanese Corporation; Vulcan XC72R (carbon black) from Cabot Corporation; graphite (graphite powder), 50870, from Fluka; sulfur (elemental sulfur, sublimed, 100 mesh) from Alfa Aesar; Gel Tac 100G (acrylic adhesive) from Advanced Polymers International, Inc.; Printex XE-2 (carbon black) from Degussa Corporation; Polycup 172 (a cationic amine polymer-epichlorohydrin adduct crosslinking agent) from Hercules; Dowanol PM (1-methoxy-2-propanol) from Dow Chemicals; PVP/VA 1-535 (polyvinyl pyrrolidone vinyl acetate copolymer) from ISP; Butvar B98 (polyvinyl butyral) from Solutia; Rhoplex GL 618 (acrylic binder) from Rhom and Haas; Ketjen EC-600 JD (carbon black) from Akzo Nobel; multifunctional aziridine from Bayer; ammonium hydroxide (29% solution), cat #22122-8, from Aldrich.

EXAMPLE 1

This example describes a protocol for preparing an electrochemical cell comprising a lithium anode and a sulfur cathode (including a 2-micron-thick uncrosslinked polyvinyl alcohol first primer layer and an aluminized polyethylene terephthalate (Al/PET) current collector), according to one embodiment of the invention. This example also shows that the first primer layer achieved good adhesion to the current collector.

To prepare the primer, 6 wt % of polyvinyl alcohol (Celvol 425) and 94 wt % of water were mixed at room temperature. The mixture was then heated to 91 degrees Celsius under agitation until a clear solution was achieved. A primer slurry was prepared by milling 5.4 wt % Vulcan XC72R carbon black, 34.6 wt % of isopropyl alcohol and 60 wt % of the Celvol 425 solution in a ball mill with ceramic beads. The slurry was coated by a slot die onto both sides of a 6 micron thick aluminized polyethylene terephthalate (Al/PET) film at a web speed of 12 feet/minute. The coating was dried in an oven at about 100 degrees Celsius. The dried primer layer had a thickness of about 2 microns on each side of the Al/PET substrate. The thickness was measured using a Mitutoyo thickness gauge (Japan). The substrate (Al/PET substrate) was measured before it was coated, and then after it had been coated with the dried primer. The thickness of the primer coating was measured as the difference between the coated and uncoated substrate.

A cathode slurry was prepared by milling 83.22 wt % isopropyl alcohol, 11.52 wt % sulfur, 3.52 wt % Printex XE-2 (carbon black), 0.32 wt % graphite, and 1.42 wt % Gel Tac 100G (acrylic adhesive) in an Attritor grinder. This slurry was further diluted with water and isopropyl alcohol to make a cathode slurry with 9 wt % solid containing 30 wt % water and 70 wt % isopropyl alcohol as co-solvents. The slurry was coated with a doctor blade on top of the primer layer. The coated cathode was dried at 80 degrees Celsius for three minutes and at 120 degrees Celsius for three minutes. The coated cathode had 1.80 mg/cm$^2$ of sulfur. The primer layer had good adhesion to both the substrate and the cathode composition.

Figure 4:
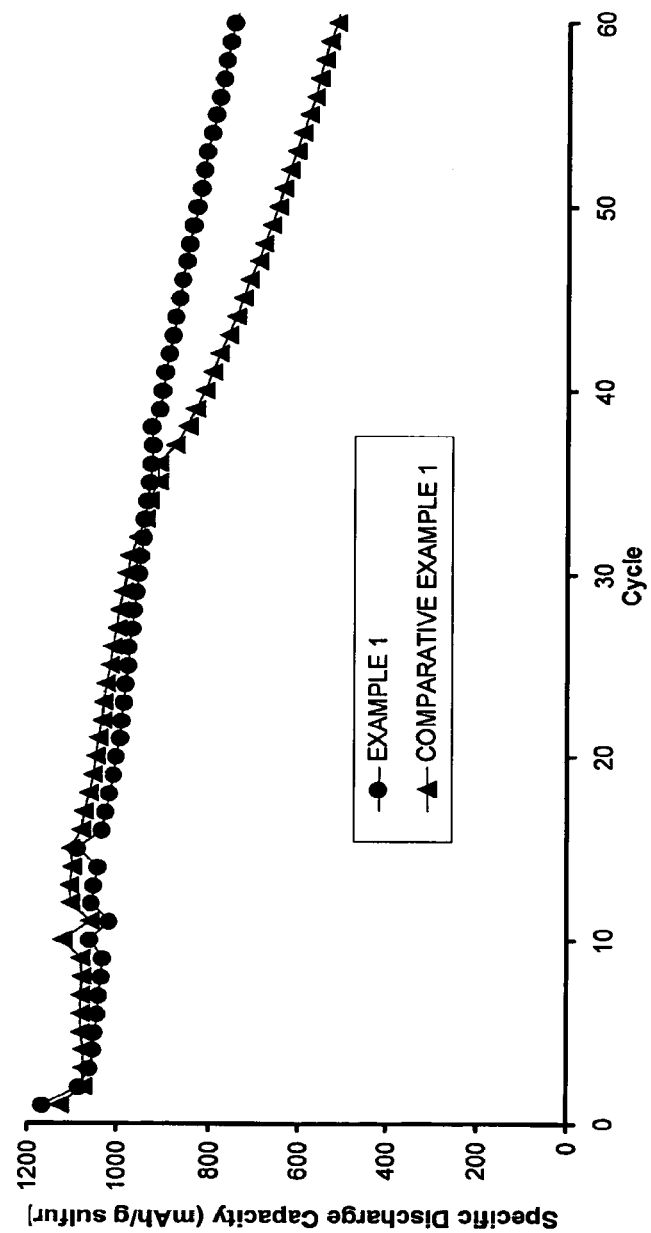
FIG. 4 shows specific discharge capacity as a function of cell cycle for the electrochemical cells described in Example 1 and Comparative Example 1 according to another embodiment of the invention.

To fabricate an electrochemical cell, the cathode, a 16 micron thick Tonen film (used as a separator), and a 2 mil thick lithium foil were laminated together and placed in a pouch. 0.3 ml of electrolyte (86.4 wt % 1,3-dioxolane, 1 wt % lithium nitrate, and 12.6 wt % lithium bis(trifluoromethylsulfonyl)imide) was injected into the pouch. The pouch was sealed and the specific discharge capacities of the cell were measured, as shown in FIG. 4.

COMPARATIVE EXAMPLE 1

This comparative example describes a protocol for preparing an electrochemical cell comprising a lithium anode and a sulfur cathode comprising a standard Intelicoat primer for use as a comparison with the electrochemical cell of Example 1. The sulfur cathode included a 6 micron aluminized polyethylene terephthalate (PET) substrate with the two-layer Intelicoat primer: a first crosslinked primer layer (1.5 microns thick) and a second uncrosslinked acrylate primer layer (1.5 microns thick) applied to each side of the substrate.

The materials and procedures presented in Example 1 were used and followed, except a current collector with an Intelicoat primer (available from Intelicoat (formally Rexam Graphics), South Hadley, Mass.) was used instead of the polyvinyl alcohol primer to adhere the cathode to the aluminized polyethylene terephthalate current collector. The thickness of the Intelicoat current collector, including primer layers on both sides of the substrate, was 12 microns.

The specific discharge capacities of the comparative example cell were measured (in mAh per gram of sulfur), as illustrated in FIG. 4. As shown in this figure, the electrochemical cell of Example 1 had a greater number of cycles having a specific discharge capacity greater than or equal to 800 mAh/gS than the electrochemical cell of Comparative Example 1. Thus, it can be inferred that the uncrosslinked polyvinyl alcohol first primer layer of Example 1 achieved good adhesion to both the cathode and aluminized polyethylene terephthalate current collector, and has better stability in an electrochemical cell than the primer of Comparative Example 1.

EXAMPLE 2

This example describes a protocol for preparing an electrochemical cell comprising a lithium anode and a sulfur cathode (including a 2-micron-thick uncrosslinked polyvinyl alcohol first primer layer and an aluminum foil current collector), according to one embodiment of the invention. This example also shows that the first primer layer achieved good adhesion to the current collector.

To prepare the primer, 4.5 wt % of Celvol 165 (polyvinyl alcohol) and 95.5 wt % of water were mixed at room temperature. The mixture was then heated to 91 degrees Celsius under agitation until a clear solution was achieved. A primer slurry was prepared by milling 4.2 wt % Vulcan XC72R carbon black, 27.88 wt % of isopropyl alcohol, 5.70 wt % of water, and 62.22 wt % of the Celvol 165 solution in a ball mill with ceramic beads. The slurry was coated with a doctor blade onto one side of a 12 micron thick aluminum foil. The coating was dried in an oven at 85 degrees Celsius for 3 minutes and 120 degrees Celsius for 3 minutes. The dried primer layer had a thickness of about 2 microns, as measured by the difference between the thicknesses of the coated and uncoated substrate.

A cathode slurry was prepared by milling 83.22 wt % isopropyl alcohol, 11.52 wt % sulfur, 3.52 wt % Printex XE-2 (carbon black), 0.32 wt % graphite, and 1.42 wt % Gel Tac 100G (acrylic adhesive) in an Attritor grinder. This slurry was further diluted with water and isopropyl alcohol to make a cathode slurry with 9 wt % solid containing 30 wt % water and 70 wt % isopropyl alcohol as co-solvents. The slurry was coated with a doctor blade on top of the primer layer. The coated cathode was dried at 80 degrees Celsius for three minutes and at 120 degrees Celsius for three minutes. The coated cathode had 2.10 mg/cm$^2$ of sulfur.

Figure 5:
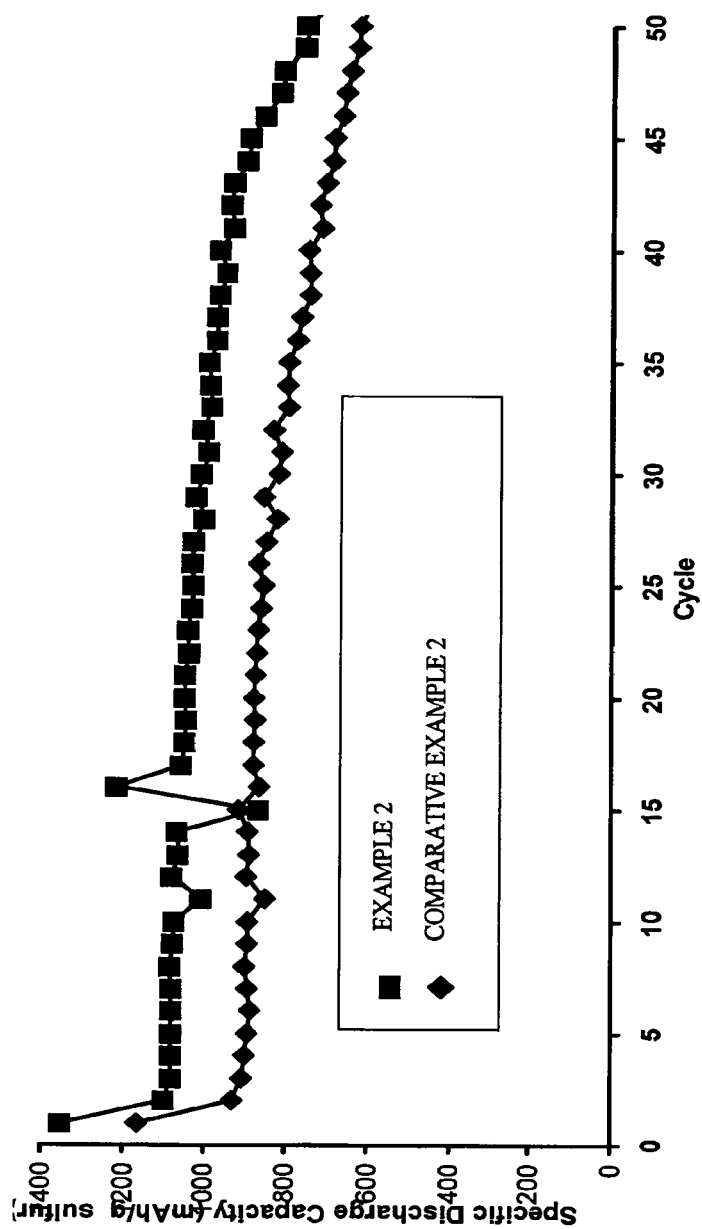
FIG. 5 shows specific discharge capacity as a function of cell cycle for the electrochemical cells described in Example 2, and Comparative Example 2 according to another embodiment of the invention.

To fabricate an electrochemical cell, the cathode, a 16 micron thick Tonen film (used as a separator), and a 2 mil thick lithium foil were laminated together and placed in a pouch. 0.3 ml of electrolyte (86.4 wt % 1,3-dioxolane, 1 wt % lithium nitrate, and 12.6 wt % lithium bis(trifluoromethylsulfonyl)imide) was injected into the pouch. The pouch was sealed and the specific discharge capacities of the cell were measured, as shown in FIG. 5.

COMPARATIVE EXAMPLE 2

This comparative example describes a protocol for preparing an electrochemical cell comprising a lithium anode and a sulfur cathode comprising a standard Intelicoat primer for use as a comparison with the electrochemical cell of Example 2. The sulfur cathode included a 6 micron aluminized polyethylene terephthalate (PET) current collector with a two-layer primer: a first crosslinked primer layer (1.5 microns thick) and a second uncrosslinked acrylate primer layer (1.5 microns thick) applied to each side of the current collector.

The materials and procedures presented in Example 2 were used and followed, except a 3 micron, two layer Intelicoat primer coating (available from Intelicoat (formally Rexam Graphics), South Hadley, Mass.) was used instead of the polyvinyl alcohol primer layer, and a 6 micron aluminized PET film was used instead of a 12 micron thick aluminum foil as the current collector.

The specific discharge capacities of the comparative example cell were measured, as illustrated in FIG. 5. As shown in this figure, the electrochemical cell of Example 2 had a longer cycle life than the electrochemical cell of Comparative Example 2. Thus, it can be inferred that the uncrosslinked polyvinyl alcohol single-layer primer of Example 2 achieved good adhesion to both the cathode and aluminum foil current collector.

EXAMPLE 3

This example describes a protocol for preparing a prismatic electrochemical cell comprising a lithium anode and a sulfur cathode (including a double layer primer comprising an uncrosslinked polyvinyl alcohol layer and an uncrosslinked polyvinyl butyral/polyvinyl pyrrolidone vinyl acetate copolymer layer, and an aluminum foil current collector), according to one embodiment of the invention. This example also shows that the double layer primer achieved good adhesion to both the cathode and aluminum foil current collector.

To prepare the first primer layer comprising polyvinyl alcohol, 6.00 wt % of Celvol 425 (polyvinyl alcohol) and 94.00 wt % of water were mixed at room temperature. The mixture was then heated to 91 degrees Celsius under agitation until a clear solution was achieved. A first primer slurry was prepared by milling 33.30 wt % of isopropyl alcohol, 4.20 wt % of Vulcan XC72R carbon black, 2.00 wt % of Dowanol PM (1-methoxy-2-propanol), 25.50 wt % of water and 35.00 wt % of the Celvol 425 solution in an Eiger mill with glass beads. The slurry was coated with a micro gravure coating head onto both sides of a 9 micron thick aluminum foil. The coatings were dried in an oven. The dried primer layers had thicknesses of about 1.4 microns.

To prepare the second primer layer comprising polyvinyl butyral/polyvinyl pyrrolidone vinyl acetate copolymer, a second primer slurry was made by milling 76.90 wt % of isopropyl alcohol, 4.2 wt % of Vulcan XC72R carbon black, 9.80 wt % of Butvar B98 (polyvinyl butyral) solution (10 wt % solid in isopropyl alcohol) and 9.10 wt % of PVP/VA 1-535 (polyvinyl pyrrolidone vinyl acetate copolymer) solution (20 wt % solid in IPA) in an Eiger mill with glass beads. The slurry was coated with a micro gravure coating head onto both sides of the first primer layer. The dried second primer layers had thicknesses of about 0.6 microns.

A cathode slurry was prepared by milling 88.00 wt % isopropyl alcohol, 8.76 wt % sulfur, 0.60 polyethylene wax, 1.92 wt % Printex XE-2 (carbon black), and 0.72 wt % Ketjen EC-600 JD carbon black in an Attritor grinder. The slurry was coated with a die onto the second primer layer and dried in an oven. The coated cathode has a loading of 1.59 mg/cm$^2$ of sulfur.

Figure 6:
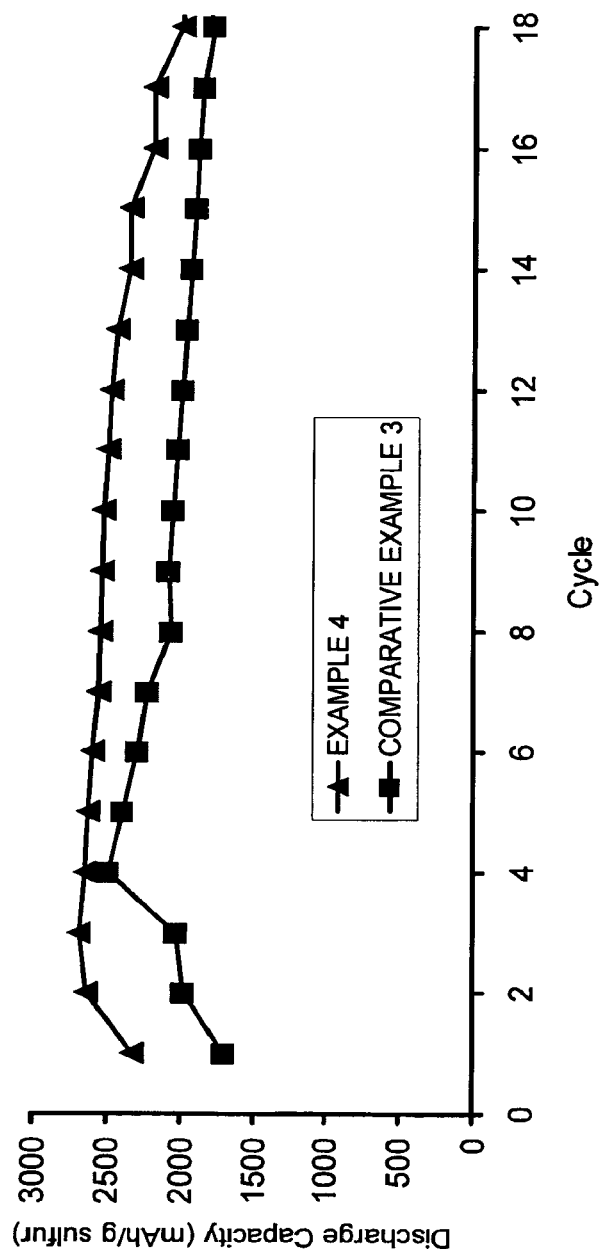
FIG. 6 shows specific discharge capacity as a function of cell cycle for the electrochemical cells described in Example 4 and Comparative Example 3 according to another embodiment of the invention.

To fabricate an electrochemical cell, the cathode, a 9 micron thick Tonen film (used as a separator), and a 2 mil thick lithium foil were wound together to form a prismatic cell, and placed in a pouch with 7.6 grams of electrolyte (80.1 wt % 1,3-dioxolane, 12.3 wt % lithium bis(trifluoromethylsulfonyl)imide, 1.0 wt % lithium nitrate, 6.6 wt % of Li$_2$S$_6$). The pouch was sealed and the specific discharge capacities of the cell were measured, as shown in FIG. 6.

COMPARATIVE EXAMPLE 3

This comparative example describes a protocol for preparing a prismatic electrochemical cell comprising a lithium anode and a sulfur cathode for use as a comparison with the electrochemical cell of Example 3. The sulfur cathode included a 12 micron aluminum foil substrate with a two-layer primer: a first crosslinked primer layer (1.5 microns thick) and a second uncrosslinked acrylate primer layer (1.5 microns thick) applied to each side of the substrate.

The materials and procedures presented in Example 3 were used and followed to fabricate an electrochemical cell, except a 3 micron thick two layer Intelicoat primer (available from Intelicoat (formally Rexam Graphics), South Hadley, Mass.) was used instead of the double layer primer, and a 12 micron thick aluminum foil was used instead of a 9 micron thick aluminum foil as the current collector.

The specific discharge capacities of the comparative example cell were measured, as illustrated in FIG. 6. As shown in this figure, the electrochemical cell of Example 3 had a longer cycle life than the electrochemical cell of Comparative Example 3. Thus, it can be inferred that the double layer primer of Example 3 achieved good adhesion to both the cathode and aluminum foil current collector.

EXAMPLE 4

This example describes a protocol for preparing an electrochemical cell comprising a lithium anode and a sulfur cathode (including a double layer primer comprising an uncrosslinked polyvinyl alcohol layer and an uncrosslinked polyvinyl pyrrolidone and polyvinyl acetate copolymer layer, and an aluminum foil current collector), according to one embodiment of the invention. This example also shows that the double layer primer achieved good adhesion to both the cathode and aluminum foil current collector.

To prepare the first primer layer comprising polyvinyl alcohol, 6.00 wt % of Celvol 425 (polyvinyl alcohol) and 94.00 wt % of water were mixed at room temperature. The mixture was then heated to 91 degrees Celsius under agitation until a clear solution was achieved. A first primer slurry was prepared by milling 33.30 wt % of isopropyl alcohol, 4.20 wt % of Vulcan XC72R carbon black, 2.00 wt % of Dowanol PM (1-methoxy-2-propanol), 25.50 wt % of water and 35.00 wt % the Celvol 425 solution in an Eiger mill with glass beads. The slurry was coated with a slot die coating head onto both sides of a 9 micron thick aluminum foil. The coating was dried in an oven. The dried primer layers had thicknesses of about 2.0 microns on each side of the substrate.

To prepare the second primer layer comprising uncrosslinked polyvinyl pyrrolidone vinyl acetate copolymer and acrylic polymer, a second primer slurry was made by milling 8.8 grams of isopropyl alcohol, 8.4 grams of water, 0.4 grams of Dowanol PM (1-methoxy-2-propanol), 0.8 grams of Vulcan XC 72R (carbon black), 0.8 grams of PVP/VA 1-535 (polyvinyl pyrrolidone vinyl acetate copolymer) and 0.8 grams of Rhoplex GL618 (an acrylic polymer binder) in a bottle with stainless steel balls. The slurry was coated with a doctor blade onto the first primer layer. The second primer layer was dried in an oven at 80 degrees Celsius for 3 minutes. The thickness of the second primer layer was about 2 microns, as applied to each side of the substrate.

A cathode slurry was prepared by milling 88.00 wt % isopropyl alcohol, 8.76 wt % sulfur, 0.60 polyethylene wax, 1.92 wt % Printex XE-d (carbon black), and 0.72 wt % Ketjen EC-600 JD carbon black in an Attritor grinder. The slurry was coated with a doctor blade onto the second primer layer. The cathode coating was dried in an oven at 80 degrees Celsius for 3 minutes and at 120 degrees Celsius for 3 minutes.

Figure 7:
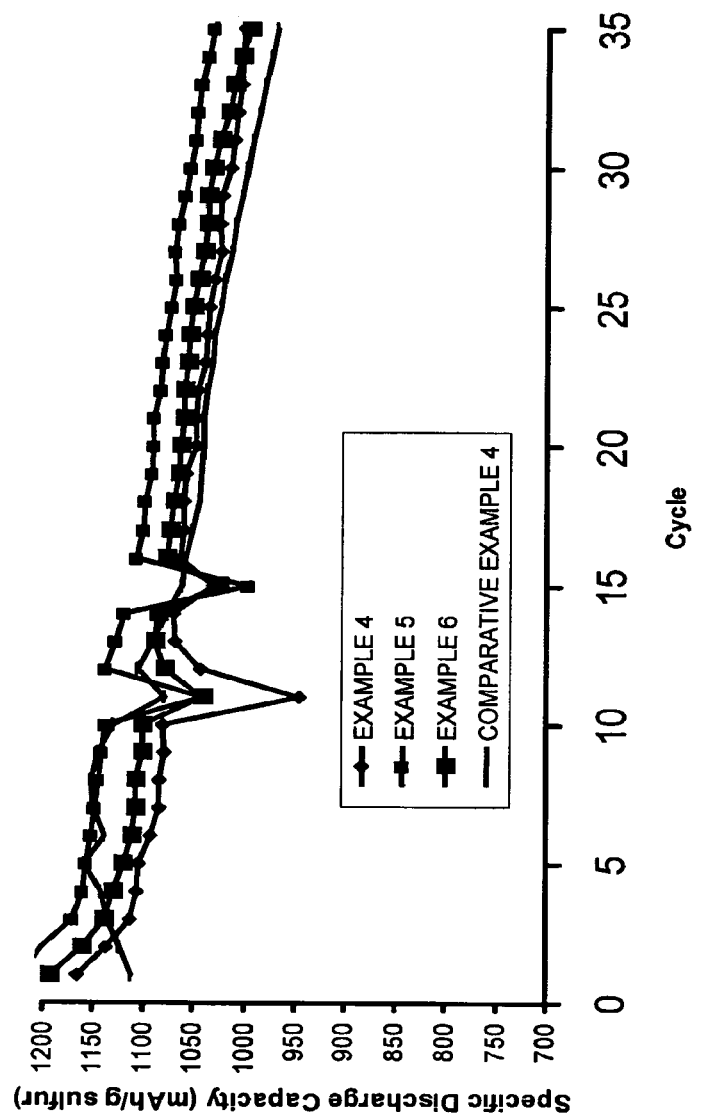
FIG. 7 shows specific discharge capacity as a function of cell cycle for the electrochemical cells described in Examples 4, 5, 6, and Comparative Example 4 according to another embodiment of the invention.

To fabricate an electrochemical cell, the cathode, a 16 micron thick Tonen film (used as a separator), and a 2 mil thick lithium foil were laminated together and placed in a pouch. 0.3 ml of electrolyte (86.4 wt % 1,3-dioxolane, 1 wt % lithium nitrate, and 12.6 wt % lithium bis(trifluoromethylsulfonyl)imide) was injected into the pouch. The pouch was sealed and the specific discharge capacities of the cell were measured, as shown in FIG. 7.

EXAMPLE 5

This example describes a protocol for preparing an electrochemical cell comprising a lithium anode and a sulfur cathode including a double layer primer comprising 1.) an uncrosslinked polyvinyl alcohol layer and 2.) a crosslinked layer including polyvinyl pyrrolidone/polyvinyl acetate copolymer and acrylic polymer, wherein the ratio of the copolymer to the acrylic polymer was 2.1:1. The primer layers were deposited on an aluminum foil current collector. This example shows that the double layer primer achieved good adhesion to both the cathode and aluminum foil current collector. This example also illustrates that a second primer layer comprising a higher ratio of polyvinyl pyrrolidone/polyvinyl acetate copolymer to acrylic polymer (e.g., a ratio of 2.1:1 compared to 0.9:1 as described in Example 6) increased adhesion between the second primer layer and the cathode.

To prepare the first primer layer comprising polyvinyl alcohol, the procedure as described in Example 4 was followed.

To prepare the second primer layer comprising a crosslinked polyvinyl pyrrolidone vinyl acetate copolymer and acrylic polymer, the procedure as described in Example 4 was followed to obtain the second primer slurry. The ratio of the polyvinyl pyrrolidone/vinyl acetate copolymer (PVP/VA 1-535) to acrylic polymer (Rhoplex GL 618) was 2.1:1. To 7 grams of the second primer slurry was added 0.2 grams of Pfaz 322 (multifunctional aziridine) solution (10% in isopropyl alcohol) and 1 drop of ammonium hydroxide (29% water solution). The slurry was coated with a doctor blade onto the first primer layer. The second primer layer was dried in an oven at 80 degrees Celsius for 3 minutes. The thickness of the second primer layer was about 2 microns, as applied to each side of the substrate.

To prepare the cathode coating layer, the cathode composition and procedure described in Example 4 was followed.

To fabricate an electrochemical cell, the cathode, a 16 micron thick Tonen film (used as a separator), and a 2 mil thick lithium foil were laminated together and placed in a pouch. 0.3 ml of electrolyte (86.4 wt % 1,3-dioxolane, 1 wt % lithium nitrate, and 12.6 wt % lithium bis(trifluoromethylsulfonyl)imide) was injected into the pouch. The pouch was sealed and the specific discharge capacities of the cell were measured, as shown in FIG. 7.

EXAMPLE 6

This example describes a protocol for preparing an electrochemical cell comprising a lithium anode and a sulfur cathode including a double layer primer comprising 1.) an uncrosslinked polyvinyl alcohol layer and 2.) a crosslinked layer including polyvinyl pyrrolidone/polyvinyl acetate copolymer and acrylic polymer, wherein the ratio of the copolymer to the acrylic polymer was 0.9:1. The primer layers were deposited on an aluminum foil current collector. This example also shows that the double layer primer achieved good adhesion to both the cathode and aluminum foil current collector.

To prepare the first primer layer comprising polyvinyl alcohol, the procedure as described in Example 3 was followed.

To prepare the second primer layer comprising crosslinked polyvinyl pyrrolidone/vinyl acetate copolymer and acrylic polymer, a second primer slurry premix was made by milling 8.6 grams of isopropyl alcohol, 8.6 grams of water, 0.4 grams of Dowanol PM (1-methoxy-2-propanol), 0.8 grams of Vulcan XC 72R (carbon black), 0.5 grams of PVP/VA 1-535 (polyvinyl pyrrolidone-vinyl acetate copolymer) and 1.2 grams of Rhoplex GL618 (an acrylic polymer binder) in a bottle with stainless steel balls. The ratio of the polyvinyl pyrrolidone/vinyl acetate copolymer (PVP/VA 1-535) to acrylic polymer (Rhoplex GL 618) was 0.9:1. The premix was mixed with 0.2 grams of Pfaz 322 (multifunctional aziridine) solution (10 wt % in isopropyl alcohol) and 1 drop of ammonium hydroxide (29 wt % in water). The thickness of the second primer layer was about 2 microns as applied to each side of the current collector.

To fabricate an electrochemical cell, the cathode, a 9 micron thick Tonen film (used as a separator), and a 2 mil thick lithium foil were wound together to form a prismatic cell, and placed in a pouch with 7.6 grams of electrolyte (80.1 wt % 1,3-dioxolane, 12.3 wt % lithium bis(trifluoromethylsulfonyl)imide, 1.0 wt % lithium nitrate, 6.6 wt % of $Li_2S_6$). The pouch was sealed and the specific discharge capacities of the cell were measured, as shown in FIG. 7.

COMPARATIVE EXAMPLE 4

This comparative example describes a protocol for preparing an electrochemical cell comprising a lithium anode and a sulfur cathode for use as a comparison with the electrochemical cells of Examples 4, 5, and 6. The sulfur cathode included a 6 micron aluminized polyethylene terephthalate (PET) current collector with a two-layer primer: a first crosslinked primer layer (1.5 microns thick) and a second uncrosslinked acrylate primer layer (1.5 microns thick) applied to each side of the current collector.

The materials and procedures presented in Example 3 were used and followed to fabricate an electrochemical cell, except a 3 micron thick two layer Intelicoat primer (available from Intelicoat (formally Rexam Graphics), South Hadley, Mass.), coated on both sides of the current collector, was used instead of the double layer primer, and a 6 micron aluminized polyethylene terephthalate current collector was used instead of a 9 micron thick aluminum foil current collector.

The specific discharge capacities of the comparative example cell were measured, as illustrated in FIG. 7. As shown in this figure, the electrochemical cell of Example 5 had the highest specific discharge capacities, followed by the cell of Example 6, and than the cell of Example 4. These specific discharge capacities were higher than those of the electrochemical cell of Comparative Example 4. Thus, it can be inferred that the double primer layers of Examples 4, 5, and 6 achieved good adhesion to both the cathode and aluminum foil current collector. This example also illustrates that the second primer layer of Example 5 comprising a higher ratio of polyvinyl pyrrolidone/polyvinyl acetate copolymer to acrylic polymer compared to that of Example 6, resulted in increased adhesion between the second primer layer and the cathode.

EXAMPLE 7

This example describes a protocol for preparing an electrochemical cell comprising a lithium anode and a sulfur cathode including a 2-micron-thick crosslinked polyvinyl alcohol single-layer primer supported by an aluminum foil current collector, according to one embodiment of the invention. This example also shows that the single-layer primer achieved good adhesion to both the current collector and cathode active material.

To prepare the crosslinked primer, 4.5 wt % of Celvol 165 (polyvinyl alcohol) and 95.5 wt % of water were mixed at room temperature. The mixture was then heated to 90 degrees Celsius under agitation until a clear solution was achieved. A primer slurry was prepared by milling 4.2 wt % Vulcan XC72R carbon black, 23.99 wt % of isopropyl alcohol, 5.70 wt % of water, and 62.22 wt % of the Celvol 165 solution in a ball mill with ceramic beads. A 2 wt % Polycup 172 solution (comprising crosslinking agent) was made by mixing 16.67 wt % of Polycup 172 and 83.33 wt % of water. A final primer slurry was prepared by mixing the primer slurry with the 2 wt % Polycup 172 solution before coating. The final primer slurry was coated with a doctor blade onto one side of a 12 micron thick aluminum foil. The coating was dried in the ovens of a coater. The dried primer layer had at thickness of about 2 microns.

A cathode slurry was prepared by milling 40.50 wt % water, 45.00 wt % isopropyl alcohol, 4.50 wt % of Dowanol PM (1-methoxy-2-propanol), 6.50 wt % sulfur, 2.00 wt % Printex XE-2 (carbon black), and 1.50 wt % graphite in a glass bottle with stainless steal beads. The slurry was coated with a die onto the above primer layer and dried in an oven of the coater. The coated cathode had 1.66 mg/cm$^2$ of sulfur.

To fabricate an electrochemical cell, the cathode, a 16 micron thick Tonen film (used as a separator), and a 2 mil thick lithium foil were laminated together and placed in a pouch. 0.3 ml of TEK1 electrolyte (86.4 wt % 1,3-Dioxolane, 1 wt % lithium nitrate, and 12.6 wt % lithium bis(trifluoromethylsulfonyl)imide) was injected into the pouch. The pouch was sealed and the specific discharge capacities of the cell were measured, as shown in FIG. 8.

Figure 8:
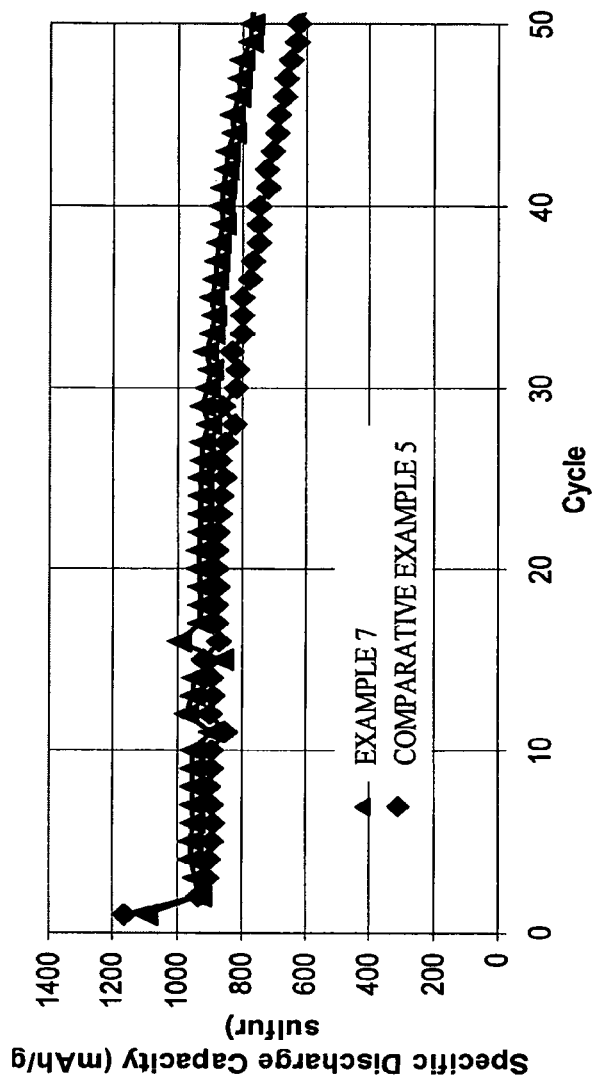
FIG. 8 shows specific discharge capacity as a function of cell cycle for the electrochemical cells described in Example 7 and Comparative Example 5 according to another embodiment of the invention.

As shown in FIG. 8, the electrochemical cell of Example 7 had higher specific discharge capacities than those of the electrochemical cell of Comparative Example 5 (which included a standard Intelicoat primer), especially after greater numbers of cycles. Thus, it can be inferred that the uncrosslinked polyvinyl alcohol single-layer primer of Example 7 achieved good adhesion to both the cathode active layer and the current collector.

COMPARATIVE EXAMPLE 5

A small flat cell was fabricated and tested by the same procedure as described in Example 8 except the cathode active material was coated on an Intelicoat primer on a 6 micron aluminized PET film.

EXAMPLE 8

This example describes a protocol for preparing an electrochemical cell comprising a lithium anode and a sulfur cathode including a 2-micron-thick crosslinked polyvinyl alcohol single-layer primer supported by an aluminum foil current collector, according to one embodiment of the invention. This example also shows that the single-layer primer achieved good adhesion to both the current collector and cathode active material.

To prepare the single-layer primer, 8 wt % of polyvinyl alcohol (Celvol 425) and 92 wt % of water were mixed at room temperature. The mixture was then heated to 91 degrees Celsius under agitation until a clear solution was achieved. A primer slurry was prepared by mixing 31.33 wt % of isopropyl alcohol, 5.00 wt % of Dowanol PM (1-methoxy-2-propanol), 20.20 wt % of water and 36.00 wt % the Celvol 425 solution (8.00 wt % in water) in a container to form a Celvol 425 mixture. 4.8 wt % of Vulcan XC72R carbon black was then added to the Celvol 425 mixture under agitation. This slurry was then milled in an Eiger mill for 40 minutes. The milled slurry was then mixed with 2.67 wt % of Polycup172 solution (comprising crosslinking agent) before coating. The slurry was coated with a slot die coating head onto both sides of a 7 micron thick aluminum foil. The coating was dried in an oven at about 100 degrees Celsius. The dried primer layer had a thickness of about 2.0 microns. The thickness was measured using a Mitutoyo thickness gauge (Japan). The substrate (Al/PET substrate) was measured before it was coated, and then after it had been coated with the dried primer. The thickness of the primer coating was measured as the difference between the coated and uncoated substrate.

A cathode slurry was prepared by milling 40.50 wt % water, 45.00 wt % isopropyl alcohol, 4.50 wt % of Dowanol PM (1-methoxy-2-propanol), 6.50 wt % sulfur, 2.00 wt % Printex XE-2 (carbon black), and 1.50 wt % graphite in a glass bottle with stainless steal beads. The slurry was coated with a die onto the above primer layer and dried in an oven of the coater. The coated cathode had 1.66 mg/cm$^2$ of sulfur.

To fabricate an electrochemical cell, the cathode, a 16 micron thick Tonen film (used as a separator), and a 2 mil thick lithium foil were laminated together and placed in a pouch (a small flat cell). 0.3 ml of electrolyte (86.4 wt % 1,3-dioxolane, 1 wt % lithium nitrate, and 12.6 wt % lithium bis(trifluoromethylsulfonyl)imide) was injected into the pouch. The pouch was sealed tested.

Figure 9:
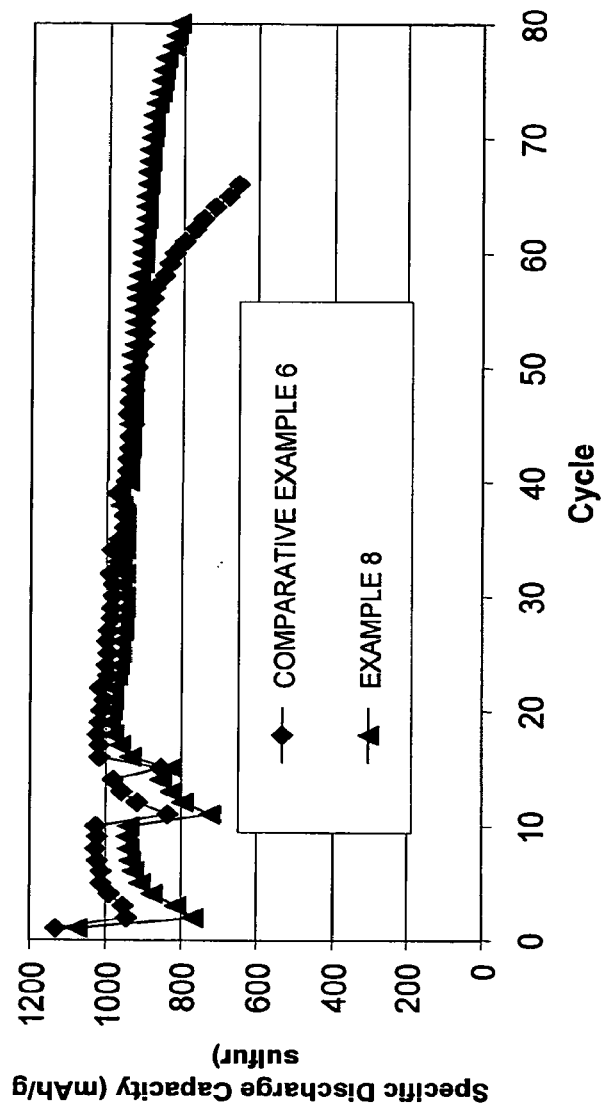
FIG. 9 shows specific discharge capacity as a function of cell cycle for the electrochemical cells described in Example 8 and Comparative Example 6 according to another embodiment of the invention.

The discharge capacity of the cells fabricated in Example 8 and Comparative Example 6 are shown in FIG. 9. As shown in this figure, the electrochemical cell of Example 8 had higher specific discharge capacities than those of the electrochemical cell of Comparative Example 6, especially after greater numbers of cycles. The electrochemical cell of Example 8 also had a longer cycle life than that of the cell of Comparative Example 6. Thus, it can be inferred that the uncrosslinked polyvinyl alcohol single-layer primer of Example 8 achieved good adhesion to both the cathode active layer and the current collector.

COMPARATIVE EXAMPLE 6

This comparative example describes a protocol for preparing an electrochemical cell comprising a lithium anode and a sulfur cathode including a 2-micron-thick uncrosslinked polyvinyl alcohol single-layer primer for use as a comparison with the electrochemical cell of Example 8.

To prepare the uncrosslinked single-layer primer, 8 wt % of polyvinyl alcohol (Celvol 425) and 92 wt % of water were mixed at room temperature. The mixture was then heated to 91 degrees Celsius under agitation until a clear solution was achieved. A primer slurry was prepared by mixing 30.00 wt % of isopropyl alcohol, 5.00 wt % of Dowanol PM (1-methoxy-2-propanol), 20.20 wt % of water and 40.00 wt % the Celvol 425 solution (8.00 wt % in water) in a container to form a Celvol 425 mixture. 4.8 wt % of Vulcan XC72R carbon black was then added to the Celvol 425 mixture under agitation. This slurry was then milled in an Eiger mill for 40 minutes. The slurry was coated with a slot die coating head onto both sides of a 7 micron thick aluminum foil. The coating was dried in an oven of the coater.

The dried primer layer had a thickness of about 2.0 microns. The thickness was measured using a Mitutoyo thickness gauge (Japan). The substrate (Al/PET substrate) was measured before it was coated, and then after it had been coated with the dried primer. The thickness of the primer coating was measured as the difference between the coated and uncoated substrate.

The same cathode slurry as that of Example 8 was coated on the above primer. The coated cathode had a loading of 1.60 mg/cm² of sulfur. An electrochemical cell was fabricated according to the procedure described in Example 8.

EXAMPLE 9

This example describes the preparation and cycling of an electrochemical cell comprising a lithium anode and a sulfur cathode including a 2-micron-thick uncrosslinked polyvinyl alcohol single-layer primer supported by a 12-micron-thick aluminum foil current collector, according to one embodiment of the invention. This example shows that an electrochemical cell made with the above-mentioned primer has better performance characteristics (e.g., higher discharge capacity and specific energy density) than a cell made with a commercially-available Intelicoat primer.

To prepare the primer, a slurry having a composition of 50 wt % Vulcan XC72R (carbon black), 10 wt % graphite, and 40 wt % polyvinyl alcohol (Celvol 425) in a water/iso-propanol mixture was coated onto both sides of a 12-micron-thick Al foil using a slot die. The coating was dried in an oven at about 100° C. The dried primer layers had a thickness of about 2 microns on each side of the Al foil. The primer layer had good adhesion to the Al foil.

A cathode slurry was prepared by milling 68 wt % sulfur, 12 wt % Printex XE-2 (carbon black), 10 wt % graphite, 5 wt % Ketjen black carbon, and 5 wt % EAA (acrylic adhesive) in iso-propanol. The slurry was coated on top of each of the primer layers. The coated cathode was dried at 110° C. The coated cathode had 1.57 mg/cm² of sulfur.

The anode electrode used was a 50-micron-thick Li foil.

The cathode and anode were wound together with a 9-micron-thick polyolefin separator into a jellyroll. The area of the active electrodes was 1141 cm². The cathode and anode tab contacts were attached to the jellyroll. The jellyrolls were placed into soft multi-layer packages, filled with 7.6 g of liquid electrolyte, and thermally sealed. The electrolyte had the following composition: 42.32 wt % of 1,3-dioxolane, 42.32 wt % of 1,2-dimethoxyethane, 4 wt % of lithium bis (trifluoromethylsulfonyl)imide, 3.77 wt % of lithium nitrate, 6.2 wt % of $Li_2S_8$, 1 wt % of guanidinium nitrate, and 0.4 wt % of pyridinium nitrate.

Fresh electrochemical cells had an AC 1 kHz impedance 70 milliohms. The prismatic cell mass was about 17.3 g. The cell was discharged at a current of 500 mA (C/5 rate) to a cutoff voltage 1.7 V. The cell discharge capacity at the C/5 rate was 2656 mAh. The specific energy at the C/5 rate was 323 Wh/kg.

COMPARATIVE EXAMPLE 7

An electrochemical cell similar to the one described in Example 9 was made, with the exception that the 12 micron Al foil was coated on both sides with an Intelicoat primer layer (available from Intelicoat (formally Rexam Graphics), South Hadley, Mass.) instead of the primer described in Example 9.

Fresh electrochemical cells had an AC 1 kHz impedance of 160-200 milliohms. The electrochemical cell was discharged at the same conditions as those described in Example 9. The cell discharge capacity at the C/5 rate was 1868 mAh. The specific energy at the C/5 rate was 218 Wh/kg.

EXAMPLE 10

This example describes the preparation and cycling of an electrochemical cell comprising a lithium anode and a sulfur cathode including a 2-micron-thick uncrosslinked polyvinyl alcohol single-layer primer supported by a 7-micron-thick aluminum foil current collector, according to one embodiment of the invention. This example shows that an electrochemical cell made with the above-mentioned primer has better performance characteristics (e.g., lower area specific resistance and direct current resistance) than a cell made with a commercially-available Intelicoat primer.

The primer layer described in Example 9 was coated on both sides of a 7-micron-thick aluminum foil.

A cathode slurry was prepared by milling 73 wt % sulfur, 16 wt % Printex XE-2 (carbon black), 6 wt % Ketjen black carbon, and 5 wt % polyethylene powder in iso-propanol. The slurry was coated on top of each of the primer layers. The coated cathode had a sulfur loading of 1.58 mg/cm².

The anode electrode used was a 50-micron-thick Li foil.

The cathode and anode were wound together with a 9-micron-thick polyolefin separator into a jellyroll. The area of the active electrodes was 1165 cm². Nickel cathode and anode tab contacts were attached to the jellyroll. The combined resistance of nickel cathode and anode tab contacts ($R_{tab}$) was 15 milliohms. The cells were assembled and filled using the same materials and methods described in Example 9.

The cell was discharged and charged four times. The discharge conditions were as follows: 500 mA current, 1.7 V cutoff voltage. The charge conditions were as follows: 315 mA current, 2.5 V cutoff voltage. At the $5^{th}$ cycle, fully-charged cells were discharged at different currents, I, in the range from 0.5 A to 8.8 A. The cell voltage, V(I), was measured at the middle of discharge at the different currents. Cell polarization was calculated as a difference between the cell open circuit voltage at this point and the voltage at a certain current according to equation 1. Cell polarization vs. discharge current is plotted in FIG. 10. The slope of this plot (line 50) represents cell direct current resistance according to equation 2. The value of DCR was 22.6 milliohms.

To determine cathode-separator-anode stack area specific resistance, the cell DCR was first corrected for tab resistance and then converted into ASR by taking into account the active electrode area A, according to equation 3. The value of ASR was 8.9 ohm·cm².

COMPARATIVE EXAMPLE 8

An electrochemical cell similar to the one described in Example 10 was made, with the exception that the 7-micron-thick aluminum foil current collector was coated on both sides with an Intelicoat primer layer (available from Intelicoat (formally Rexam Graphics), South Hadley, Mass.) instead of the primer described in Example 10.

The electrochemical cell was assembled electrical testing was performed using the same method described in Example 10. The polarization resistance of the Intelicoat-primer cells vs. discharge current is represented in line 52 of FIG. 10. The DCR represented by the slope of this plot had a value of 72.3 milliohms. The ASR of the cell was 66.8 ohm·cm², which was calculated using Equation 3.

Figure 10:
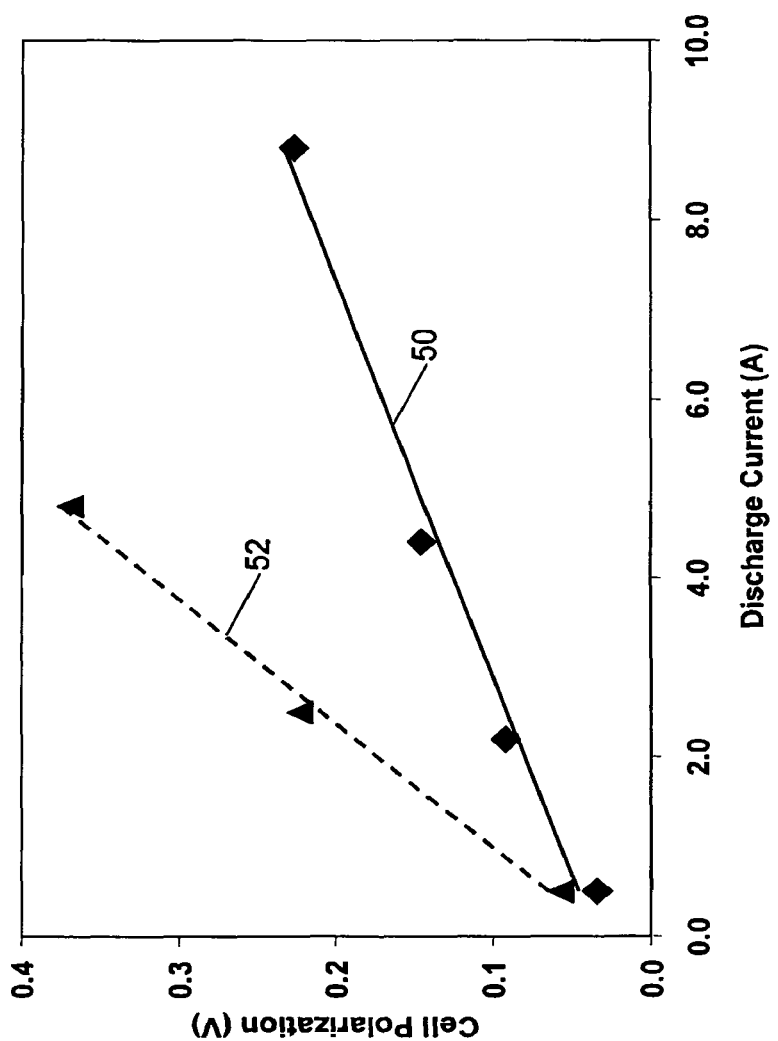
FIG. 10 shows polarization as a function of discharge current for the electrochemical cells described in Example 10 and Comparative Example 8 according to another embodiment of the invention.

As shown in FIG. 10 and as described herein, the electrochemical cell of Example 10 had a lower cell polarization as a function of current discharge (and, therefore, lower direct current resistance and area specific resistance) than the cell of Comparative Example 8. This shows that the polyvinyl alcohol primer promoted better adhesion and electrical conduction between the sulfur cathode and the Al foil current collector than the primer of Comparative Example 8.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present invention.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of", when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. An electrode comprising:
 a conductive support;
 a primer layer comprising a polymeric material, wherein at least 10% by weight of the polymeric material is non-crosslinked, and wherein at least a portion of the polymeric material is crosslinked; and
 an electroactive layer in electrical communication with the primer layer, wherein the electroactive layer comprises an electroactive sulfur-containing material,
 wherein the primer layer adheres to the conductive support and the electroactive layer.

2. An electrode as in claim 1, wherein the polymeric material comprises hydroxyl functional groups.

3. An electrode as in claim 1, wherein the polymeric material is polyvinyl alcohol.

4. An electrode as in claim 1, wherein the polymeric material is polyvinyl fluoride.

5. An electrode as in claim 1, wherein the electroactive layer is different from the primer layer.

6. An electrode as in claim 1, wherein at least portions of the electroactive layer and the primer layer are formed of different materials.

7. An electrode as in claim 1, wherein at least a portion of the primer layer does not include an electroactive material.

8. An electrode as in claim 1, wherein the electroactive layer comprises a polymer including function groups that can interact with functional groups of the polymeric material of the primer layer.

9. An electrode as in claim 1, wherein the primer layer is immediately adjacent the electroactive layer.

10. An electrode as in claim 1, wherein the primer layer includes a conductive filler in the range of 10-90% by weight of the primer layer after the primer layer has been dried.

11. An electrode as in claim 1, wherein the primer layer includes a conductive filler in the range of 40-80% by weight of the primer layer after the primer layer has been dried.

12. An electrode as in claim 10, wherein the conductive filler is carbon black.

13. An electrode as in claim 1, wherein the primer layer includes a total amount of polymeric material in the range of 30-60% by weight of the primer layer.

14. An electrode as in claim 1, wherein the thickness of the primer layer is less than 10 microns.

15. An electrode as in claim 1, wherein the thickness of the primer layer is less than 3 microns.

16. An electrode as in claim 1, wherein the primer layer comprises less than 30% by weight of a crosslinked polymeric material.

17. An electrode as in claim 1, wherein the primer layer comprises less than 30% by weight of crosslinked polyvinyl alcohol.

18. An electrode as in claim 1, wherein the electroactive sulfur-containing material comprises elemental sulfur.

19. An electrode as in claim 1, wherein the electroactive layer includes the electroactive sulfur-containing material in the range of 20% to 90% by weight of the electroactive layer.

20. An electrode as in claim 1, wherein the polymeric material of the primer layer comprises hydroxyl functional groups and the electroactive layer comprises a polymeric material comprising hydroxyl functional groups.

21. An electrode as in claim 20, wherein the polymeric material comprising hydroxyl functional groups of the primer layer is polyvinyl alcohol and the polymeric material comprising hydroxyl functional groups of the electroactive layer is polyvinyl alcohol.

22. An electrode as in claim 21, wherein the primer layer includes a conductive filler in the range of 10-90% by weight of the primer layer after the primer layer has been dried.

23. An electrode as in claim 1, wherein the primer layer includes greater than 10% by weight of crosslinked polymeric material.

24. An electrode as in claim 1, wherein the primer layer includes greater than 30% by weight of crosslinked polymeric material.

* * * * *

UNITED STATES PATENT AND TRADEMARK OFFICE
CERTIFICATE OF CORRECTION

PATENT NO. : 8,968,928 B2  
APPLICATION NO. : 14/078127  
DATED : March 3, 2015  
INVENTOR(S) : Yongzhong Wang et al.

Page 1 of 1

It is certified that error appears in the above-identified patent and that said Letters Patent is hereby corrected as shown below:

In the Specification

At column 15, line 14 "Primer layers and electro active layers (e.g., cathode active". It should read -- Primer layers and electroactive layers (e.g., cathode active --.

At column 20, lines 17 and 18 reads "arrangement, a substantially minor-image structure is created with a minor plane passing through electrode 2". It should read -- arrangement, a substantially mirror-image structure is created with a mirror plane passing through electrode 2. This would be --.

At column 20, line 55 "1-535" should read -- I-535 --.

At column 23, line 42 "1-535" should read -- I-535 --.

At column 24, line 52 "1-535" should read -- I-535 --.

At column 25, line 33 "1-535" should read -- I-535 --.

At column 26, lines 6 and 11 "1-535" should read -- I-535 --.

Signed and Sealed this  
Seventh Day of July, 2015

Michelle K. Lee  
*Director of the United States Patent and Trademark Office*